(12) United States Patent
Kanatake et al.

(10) Patent No.: US 8,437,233 B2
(45) Date of Patent: May 7, 2013

(54) OPTICAL RECORDING/REPRODUCTION METHOD AND OPTICAL RECORDING/REPRODUCTION DEVICE

(75) Inventors: Yusuke Kanatake, Tokyo (JP); Tomo Kishigami, Tokyo (JP); Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/642,856

(22) PCT Filed: Dec. 15, 2010

(86) PCT No.: PCT/JP2010/007276
§ 371 (c)(1),
(2), (4) Date: Oct. 23, 2012

(87) PCT Pub. No.: WO2011/155008
PCT Pub. Date: Dec. 15, 2011

(65) Prior Publication Data
US 2013/0044576 A1 Feb. 21, 2013

(30) Foreign Application Priority Data
Jun. 9, 2010 (JP) .................. 2010-131869

(51) Int. Cl.
*G11B 11/00* (2006.01)
(52) U.S. Cl.
USPC .................. 369/53.28; 369/94

(58) Field of Classification Search .................. None
See application file for complete search history.

(56) References Cited

U.S. PATENT DOCUMENTS

| 2002/0195540 A1 | 12/2002 | Higuchi |
| 2007/0206459 A1 | 9/2007 | Iwamoto et al. |
| 2009/0303847 A1 | 12/2009 | Ishikawa et al. |

FOREIGN PATENT DOCUMENTS

| JP | 2003-77142 A | 3/2003 |
| JP | 2004-95106 A | 3/2004 |
| JP | 2006-48875 A | 2/2006 |
| JP | 2006-79703 A | 3/2006 |
| JP | 2007-164927 A | 6/2007 |
| JP | 2007-234159 A | 9/2007 |
| JP | 2009-301596 A | 12/2009 |

*Primary Examiner* — Paul Huber
(74) *Attorney, Agent, or Firm* — Birch, Stewart, Kolasch & Birch, LLP

(57) ABSTRACT

An optical recording/reproduction method and device that can perform control for optimizing the amount of spherical aberration in a multilayered optical disc in a short period of time. When the objective lens is displaced in the focusing direction, the amplitude value of the focusing error signal detected just after leaving the focal position of a given first recording layer and the amplitude value of the focusing error signal detected just before passing through the focal position of a given second recording layer other than the first recording layer are measured with a particular spherical aberration, the amplitude ratio of amplitude values is calculated, the difference between spherical aberration and the optimal spherical aberration for the second recording layer is approximated as a function of the amplitude ratio, the optimal spherical aberration is calculated on the basis of this approximation, and the spherical aberration is set.

10 Claims, 15 Drawing Sheets

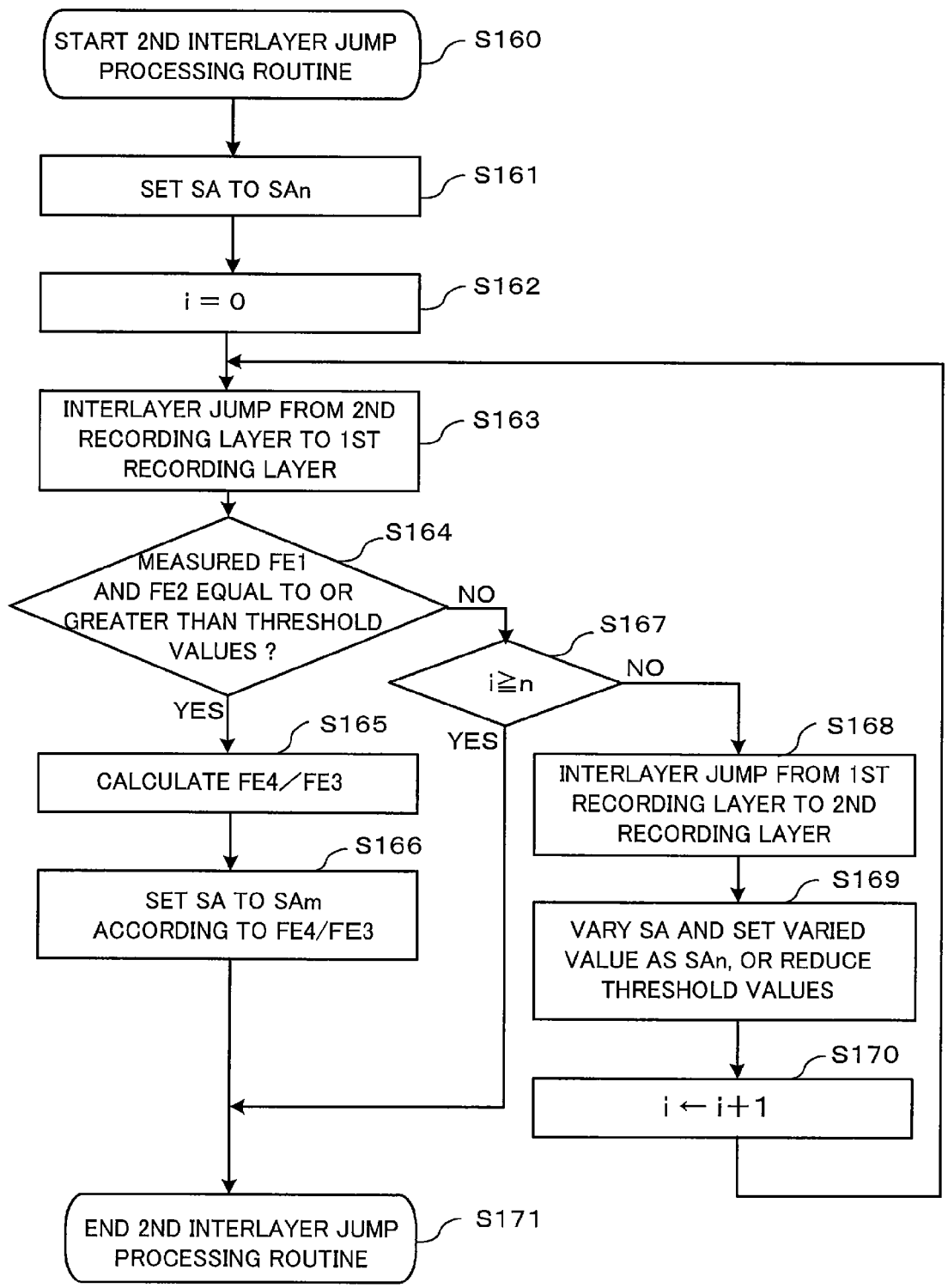

OPTICAL RECORDING/REPRODUCTION METHOD AND OPTICAL RECORDING/REPRODUCTION DEVICE

This application is a 371 of PCT/JP2010/007276, filed Dec. 15, 2010.

TECHNICAL FIELD

The present invention relates to an optical recording/reproduction method and an optical recording/reproduction device for recording and/or reproducing data on the information recording surfaces of a multilayered optical disc with a plurality of recording layers.

BACKGROUND ART

Optical recording/reproduction devices for large-capacity optical discs such as Blu-ray discs (BD) have become common in recent years. In an optical recording/reproduction device for a BD, in comparison with an optical recording/reproduction device for a DVD, the spot of the laser beam that illuminates the information recording surface of the optical disc is smaller, the wavelength of the laser light is shorter, and the numerical aperture (NA) of the objective lens is greater, and for these and other reasons, the effect of spherical aberration must be considered. It is therefore necessary to control the amount of spherical aberration in an optical recording/reproduction device for a BD (see, for example, Patent Reference 1). Patent Reference 1 discloses a method that controls the amount of spherical aberration so as to maximize the amplitude of a tracking error signal.

Due to demands for still greater capacities, multilayered BDs having multiple recording layers have become common. In recording or reproducing data on a multilayered BD, processing occurs for performing an interlayer jump from one recording layer to another, and depending on the distance between the layers, the optimal amount of spherical aberration in each recording layer may differ. Methods of controlling the optimal amount of spherical aberration in each recording layer have therefore been proposed (see, for example, Patent References 2 and 3).

Patent Reference 2 discloses a method of calculating spherical aberration offsets between the recording layers, based on the S-shaped waveform of a focus error signal detected when the objective lens is displaced in the focusing direction.

Patent Reference 3 discloses a method that determines the amount of spherical aberration that maximizes the amplitude of the S-shaped waveform of the focus error signal detected when the objective lens is displaced in the focusing direction and sets that amount of spherical displacement, multiplied by a correction coefficient, as the optimal amount of spherical aberration for each recording layer.

PRIOR ART REFERENCES

Patent References

Patent Reference 1: Japanese Patent Application Publication No. 2004-095106 (paragraphs 0053, 0060, 0075, 0083 and FIGS. 4 and 8)
Patent Reference 2: Japanese Patent Application Publication No. 2003-077142 (paragraphs 0023, 0024 and FIG. 4)
Patent Reference 3: Japanese Patent Application Publication No. 2006-079703 (paragraphs 0068-0073 and FIG. 6)

SUMMARY OF THE INVENTION

Problems to be Solved by the Invention

A problem in the method of Patent Reference 2 is that it lengthens the recording time on a multilayered optical disc because before performing an interlayer jump from one recording layer to another, it adds the calculated spherical aberration offset, and after performing an interlayer jump, it again optimally controls the spherical aberration in the recording layer that is the destination of the jump.

A problem in the method described in Patent Reference 3 is that the correction coefficient is not necessarily optimal, because the spherical aberration varies not only with the distance between recording layers, but also with thickness error in the recording layers of the multilayered disc.

The present invention addresses the problems of the prior art described above, with the object of providing an optical recording/reproduction method and an optical recording/reproduction device that can carry out optimal spherical aberration control in a short time in a multilayered optical disc.

Means for Solving the Problem

An optical recording/reproduction method according to the present invention includes an illumination and light reception step for directing laser light through an objective lens while displacing the objective lens in the focusing direction to illuminate one of the recording layers of a multilayered optical disc having k recording layers (k being an integer equal to or greater than two) with a focused spot and receiving light reflected from the multilayered optical disc with a light receiving element, a signal processing step for generating a spherical aberration control signal for the focused spot from a received light signal output from the light receiving element on a basis of the received light, and a spherical aberration control step for controlling the spherical aberration according to the spherical aberration control signal. The signal processing step includes a step of obtaining amplitude information about a focus error signal detected during the step of displacing the objective lens in the focusing direction, a step of calculating, from a ratio of an amplitude value of the focus error signal detected just after leaving a focal position of an arbitrary s-th recording layer of the multilayered optical disc (s being an integer satisfying ($1 \leq s \leq k$)) and an amplitude value of the focus error signal detected just before passing through a focal position of an arbitrary t-th recording layer of the multilayered optical disc (t being an integer satisfying ($1 \leq t \leq k$, $t \neq s$)), an optimal amount of spherical aberration for the t-th recording layer, and a step of generating the spherical aberration control signal on a basis of the calculated optimal amount of spherical aberration.

An optical recording/reproduction device according to the present invention includes an illumination and light reception section for directing laser light through an objective lens while displacing the objective lens in the focusing direction to illuminate one of the recording layers of a multilayered optical disc having k recording layers (k being an integer equal to or greater than two) with a focused spot and receiving light reflected from the multilayered optical disc with a light receiving element, a signal processing section for generating a spherical aberration control signal for the focused spot from a received light signal output from the light receiving element on a basis of the received light, and a spherical aberration control section for controlling the spherical aberration according to the spherical aberration control signal. The signal processing section obtains amplitude information about a focus error signal detected when the objective lens is displaced in the focusing direction, calculates, from a ratio of an amplitude value of the focus error signal detected just after leaving a focal position of an arbitrary s-th recording layer of the multilayered optical disc (s being an integer satisfying $1 \leq s \leq k$) and an amplitude value of the focus error signal detected just before passing through a focal position of an arbitrary t-th recording layer of the multilayered optical disc (t being an integer satisfying $1 \leq t \leq k$, $t \neq s$), an optimal amount of spherical aberration for the t-th recording layer, and generates the spherical aberration control signal on a basis of the calculated optimal amount of spherical aberration.

Effects of the Invention

In a device for recording on or reproducing from a multilayered optical disc, optimal spherical aberration control can be carried out according to the present invention in a short time.

BRIEF DESCRIPTION OF THE DRAWINGS

FIG. 8 is a flowchart showing an exemplary second interlayer jump processing routine in the optical recording/reproduction device in the first embodiment.

MODE FOR CARRYING OUT THE INVENTION

First Embodiment

Figure 1:
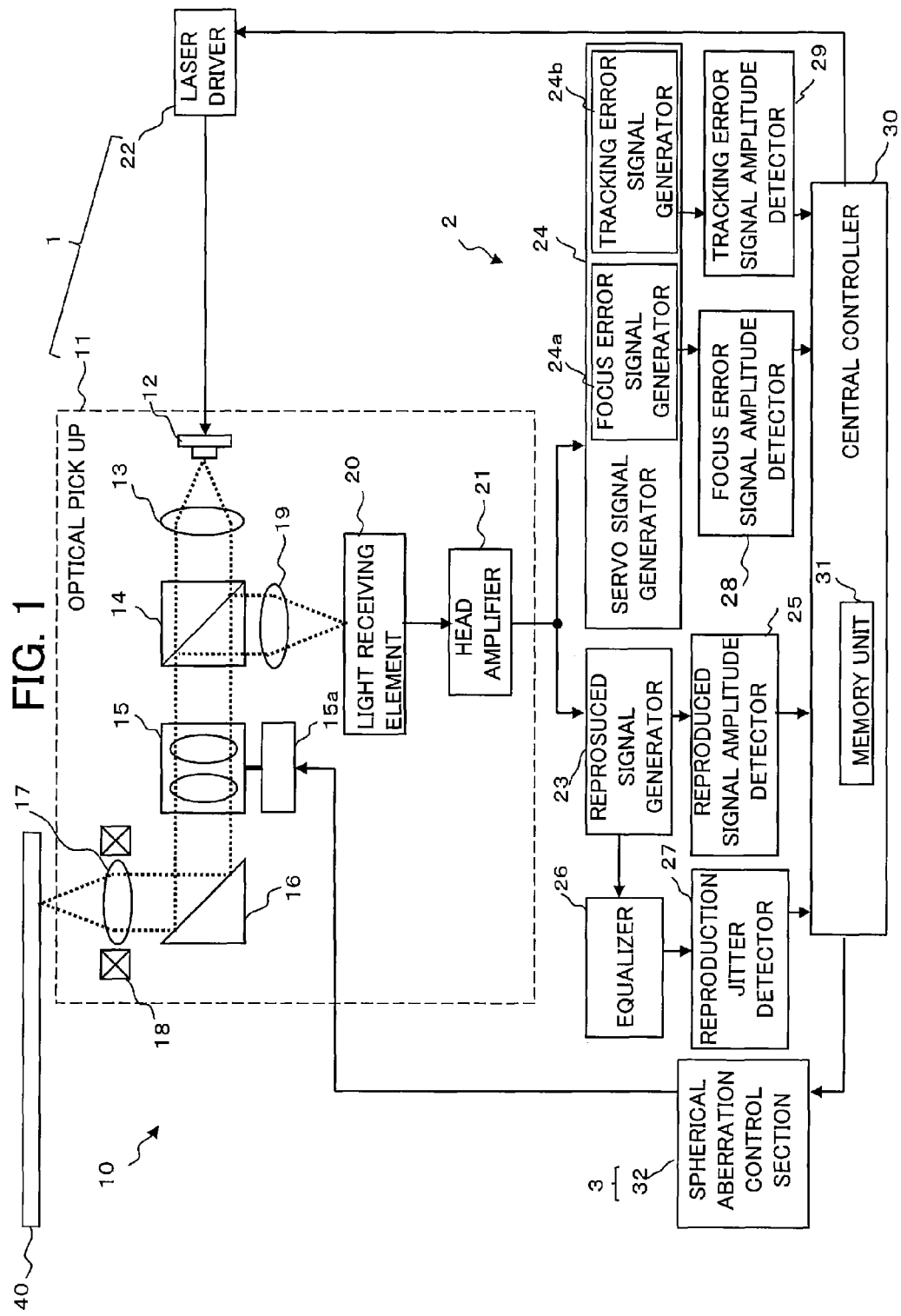
FIG. 1 schematically shows the structure of an optical recording/reproduction device according to first to fourth embodiments (that is, a device that can execute the optical recording/reproduction methods in the first to fourth embodiments).

FIG. 1 schematically shows the structure of an optical recording/reproduction device 10 according to a first embodiment (that is, a device that can execute the optical recording/reproduction method in the first embodiment). The optical recording/reproduction device 10 is configured for incorporation into a recording/reproduction device that records and/or reproduces data on the information recording surfaces of a multilayered optical disc 40. With the multilayered optical disc 40 inserted, partway through recording and reproduction operations, for example, the optical recording/reproduction device 10 controls the amount of spherical aberration according to changes in the layers covering of the information recording layers etc. Multilayered optical discs 40 are normally classifiable into three types: the reproduce-only type on which only reproduction (reading) can be performed; the write-once type on which it is possible to write only once; and the rewritable type that permits both writing and erasing. The optical recording/reproduction device in the first embodiment is capable of performing recording and reproduction on any of these types of optical discs.

As shown in FIG. 1, the optical recording/reproduction device 10 according to the first embodiment includes an illumination and light reception section 1 having an optical pickup 11 and a laser driver 22, a signal processing section 2 for performing processing on or on the basis of a detected signal obtained from the optical pickup 11, and a spherical aberration control section 3 for causing the optical pickup 11 to control spherical aberration according to signals generated and detected (measured) in the signal processing section 2. The optical pickup 11 of the illumination and light reception section 1 directs laser light through the layers (not shown) covering the information recording layers (also referred to as 'recording layers') of the multilayered optical disc 40 to illuminate an information recording layer with a focused spot and receives light reflected from the information recording layer in the multilayered optical disc 40. The signal processing section 2 generates a spherical aberration control signal on the basis of the received light signal obtained by the optical pickup 11 from the reflected light. In this description, the amount of spherical aberration is equivalent to, for example, the position of a spherical aberration control element 15 determined by a structure (not shown) that movably supports the spherical aberration control element 15; the position of the spherical aberration control element 15 is controlled by a spherical aberration control device 15a. The spherical aberration control device includes, for example, a structure for movably supporting the spherical aberration control element 15, a driving section for supplying driving power to this structure, etc. The spherical aberration control device, however, is not restricted to a configuration of this type.

As shown in FIG. 1, the optical pickup 11 includes a semiconductor laser 12 driven and controlled by the laser driver 22, and a collimating lens 13, a splitter 14, a spherical aberration control element 15, a total reflection mirror 16, an objective lens 17, an objective lens actuator 18, a detection lens 19, a light receiving element 20, and a head amplifier 21. In data reproduction, laser light having an output value (reproduction power) necessary for reproducing data is directed from the semiconductor laser 12 through the collimating lens 13, splitter 14, spherical aberration control element 15, total reflection mirror 16, and objective lens 17 so that it is focused onto and illuminates an information recording layer of the multilayered optical disc 40. Light reflected from the information recording layer of the multilayered optical disc 40 passes through the objective lens 17, total reflection mirror 16, and spherical aberration control element 15, is deflected by the splitter 14, and is received by the light receiving element 20 through the detection lens 19. The light receiving element 20 has, for example, a plurality of receiving surfaces that convert the received light signal to electrical signals, and output the electrical signals.

During recording or reproduction on a multilayered optical disc 40, processing occurs for performing interlayer jumps from one recording layer to another. An interlayer jump from a first recording layer to a second recording layer is a process of moving the focal position of the focused spot of laser light directed onto the information recording surface of the multi-layered optical disc 40 from the first recording layer to the second recording layer by displacing the objective lens 17 in the focusing direction.

As shown in FIG. 1, the signal processing section 2 includes a reproduced signal generator 23, a servo signal generator 24, a reproduced signal amplitude detector 25, an equalizer 26, a reproduction jitter detector 27, a focus error signal amplitude detector 28, a tracking error signal amplitude detector 29, a central controller 30, and a memory unit 31. The servo signal generator 24 includes a focus error signal generator 24a and a tracking error signal generator 24b. Although the memory unit 31 is included in the central controller 30 in FIG. 1, the memory unit 31 may be external to the central controller 30. The converted electrical signals output by the light receiving element 20 are input to the reproduced signal generator 23 and the servo signal generator 24 through the head amplifier 21. The reproduced signal generator 23 generates a reproduced signal according to the signal from the head amplifier 21, and outputs the generated reproduced signal to the reproduced signal amplitude detector 25 and the equalizer 26. The equalizer 26 shapes the received reproduced signal, and outputs the shaped reproduced signal to the reproduction jitter detector 27. The reproduction jitter detector 27 detects a jitter value, which is an index obtained from the reproduced signal and the absolute value of the clock phase error of a clock generated by a PLL (Phase Locked Loop, not shown). The focus error signal generator 24a and the tracking error signal generator 24b in the servo signal generator 24 generate a focus error signal detected by displacing the objective lens 17 in the focusing direction and a tracking error signal detected by displacing the objective lens 17 in the tracking direction, respectively. The focus error signal generated by the focus error signal generator 24a is input to the focus error signal amplitude detector 28, and the tracking error signal generated by the tracking error signal generator 24b is input into the tracking error signal amplitude detector 29. Amplitude information detected by the reproduced signal amplitude detector 25, reproduction jitter detector 27, focus error signal amplitude detector 28, and tracking error signal amplitude detector 29 is supplied to the central controller 30, which determines an amount of spherical aberration from the supplied information and sends the amount of spherical aberration to the spherical aberration controller 32. The focus error signal generator 24a may use a well known method such as, for example, the anastigmatic method, knife-edge method, or spot-size detection method to generate the focus error signal. The tracking error signal generator 24b may use a well known method such as, for example, the push-pull method, DPP (Differential Push-Pull) method, or DPD (Differential Phase Detection) method to generate the tracking error signal.

As shown in FIG. 1, the spherical aberration control section 3 includes a spherical aberration controller 32. The spherical aberration controller 32 controls spherical aberration by driving the spherical aberration control element 15 in the optical pickup 11. Although the optical recording/reproduction device 10 controls the amount of spherical aberration according to changes in the layers covering of the information recording layers etc. partway through recording and reproduction operations with the multilayered optical disc 40 inserted, for example, the time at which this control is performed is not restricted.

Figure 2:
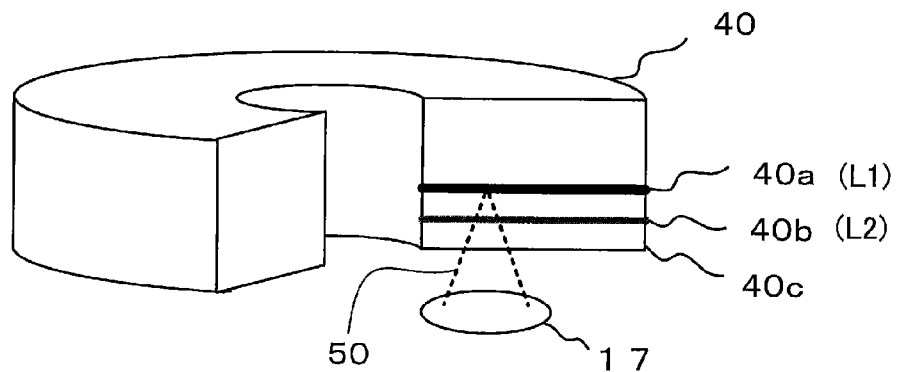
FIG. 2 is a partially cutaway perspective view schematically illustrating the structure of a dual-layer BD.

FIG. 2 is a partially cutaway perspective view schematically illustrating the structure of a dual-layer BD having two recording layers (the number k of recording layers is two), exemplifying the multilayered optical disc 40 shown in FIG. 1. The dual-layer BD in FIG. 2 includes a first recording layer

40a (L1), a second recording layer 40b (L2), and a surface 40c; as seen from the objective lens 17, the more distant recording layer is the first recording layer 40a and the closer recording layer is the second recording layer 40b. FIG. 2 shows an exemplary case in which the objective lens 17 is focused on the first recording layer 40a, as indicated by the light bundle 50. Recording or reproduction on a dual-layer BD will be described in the first embodiment below.

FIG. 3(*a*) shows an exemplary waveform (S-shaped waveform) of the focus error signal detected during the time PJ of an interlayer jump made from the first recording layer L1 to the second recording layer L2 in the dual-layer BD; FIG. 3(*b*) shows an exemplary waveform (S-shaped waveform) of the focus error signal detected during the time PJ of an interlayer jump made from the second recording layer L2 to the first recording layer L1. In the present application, both S-shaped waveforms in which two waveform peaks directed in mutually opposite directions (peaks of opposite polarity) occur in succession and reverse S-shaped waveforms of this type will be referred to as S-shaped waveforms. One of the two waveform peaks that form the S-shaped waveform (half the S-shaped waveform) will be referred to as the ascending peak and the other waveform peak (the other half of the S-shaped waveform) will be referred to as the descending peak.

As shown in FIG. 3(*a*), when the objective lens 17 leaves the focal position of the first recording layer L1 (the focused spot leaves the first recording layer L1), a descending S-shaped waveform peak appears as the focus error signal generated by the focus error signal generator 24a. Just before the objective lens 17 arrives at the focal position of the second recording layer L2 (just before the focused spot arrives at the second recording layer L2), an ascending S-shaped waveform peak appears as the focus error signal. The amplitude value of the descending S-shaped waveform peak will be denoted FE1; the amplitude value of the ascending S-shaped waveform peak will be denoted FE2.

As shown in FIG. 3(*b*), when the objective lens 17 leaves the focal position of the second recording layer L2 (the focused spot leaves the second recording layer L2), an ascending S-shaped waveform appears as the focus error signal generated by the focus error signal generator 24a. Just before the objective lens 17 arrives at the focal position of the first recording layer L1 (just before the focused spot arrives at the first recording layer L1), a descending S-shaped waveform appears as the focus error signal. The amplitude value of the ascending S-shaped waveform peak will be denoted FE4; the amplitude value of the descending S-shaped waveform peak will be denoted FE3.

In the waveform shown in FIG. 3(*a*), for example, the change in voltage from the reference voltage Vr obtained when no interlayer jump is made is measured at certain sampling intervals and compared with the threshold value $\Delta Vt1$ or $\Delta Vt2$ shown in FIG. 3(*a*); the amplitude values FE1 and FE2 are amplitudes of the waveform measured when the voltage change is equal to or greater than the threshold value. More specifically, during the time period PJ from the start to the end of the interlayer jump, FE1 is the amplitude value of the descending peak waveform the first time the change in voltage from the reference value (the absolute value of the change) becomes equal to or greater than the threshold value, and FE2 is the amplitude value the second time the change becomes equal to or greater than the threshold value. Although the threshold value $\Delta Vt1$ or $\Delta Vt2$ may be set freely in the first embodiment, it is necessary to select appropriate threshold values such that waveform peaks with voltage changes equal to or greater than a threshold value do not appear more than twice when the focal position moves.

Similarly, in the waveform shown in FIG. 3(*b*), for example, the change in voltage from the reference voltage obtained when no interlayer jump is made is measured at certain sampling intervals and compared with the threshold value $\Delta Vt3$ or $\Delta Vt4$ shown in FIG. 3(*b*), and the amplitude values FE3 and FE4 are amplitudes of the waveform when the voltage change is equal to or greater than the threshold value. More specifically, during the time period PJ from the start to the end of an interlayer jump, FE4 is the amplitude value the first time the change in voltage from the reference value becomes equal to or greater than the threshold value, and FE3 is the amplitude value the second time the change becomes equal to or greater than the threshold value. Although the threshold value $\Delta Vt3$ or $\Delta Vt4$ may be set freely in the first embodiment, it is necessary to select appropriate threshold values such that waveform peaks with voltage changes equal to or greater than a threshold value do not appear more than twice when the focal position moves.

The waveform of the focus error signal detected when an interlayer jump is made from the first recording layer L1 to the second recording layer L2 and the waveform of the focus error signal detected when an interlayer jump is made from the second recording layer L2 to the first recording layer L1 are not restricted to waveforms like the ones shown in FIGS. 3(*a*) and 3(*b*).

Figure 3A:
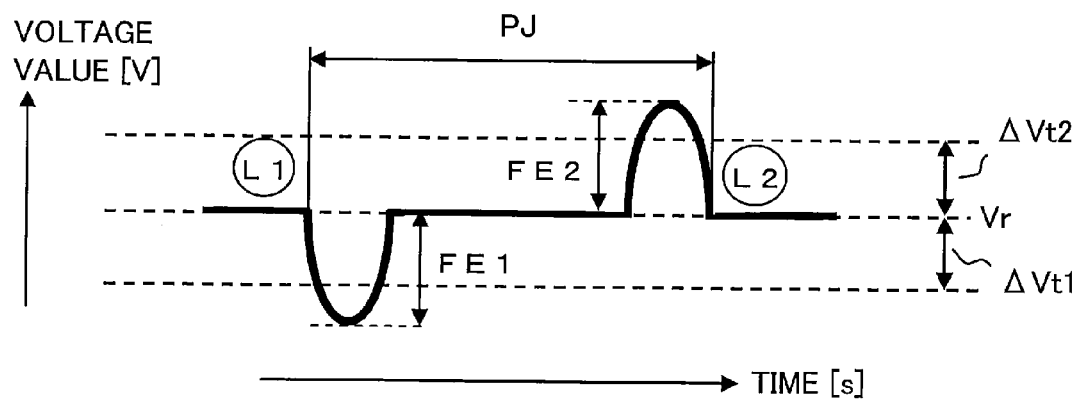
FIG. 3(a) shows an exemplary focus error signal detected when an interlayer jump is made from a first recording layer to a second recording layer in a dual-layer BD.
Figure 3B:
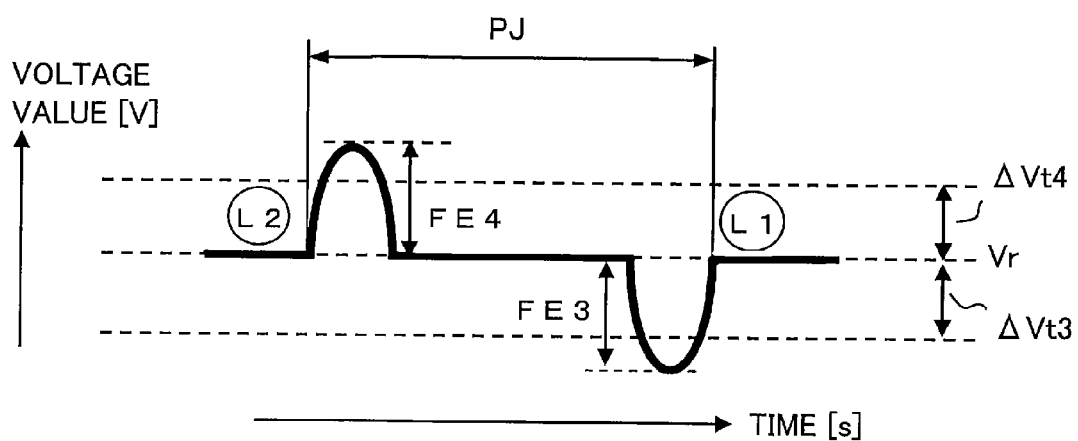
FIG. 3(b) shows an exemplary focus error signal detected when an interlayer jump is made from the second recording layer to the first recording layer.
Figure 4:
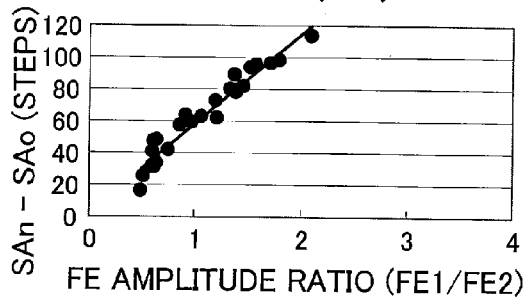
FIGS. 4(a1), 4(a2), 4(b1), 4(b2), 4(c1), and 4(c2) show results of measurements of a relation involving the amplitude ratio FE1/FE2 of the amplitude values of the ascending and descending S-shaped waveform peaks in the focus error signal detected when an interlayer jump is made from the first recording layer to the second recording layer with the spherical aberration set to SAn and the difference (SAn−SAo) between SAn and SAo (the optimal spherical aberration for the second recording layer).
Figure 4:
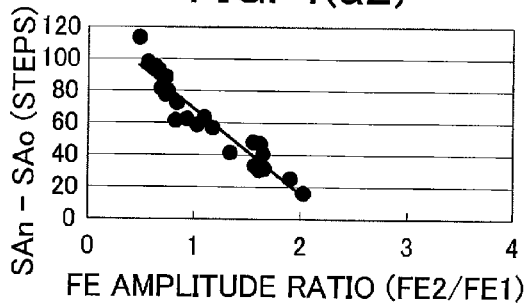
Figure 4:
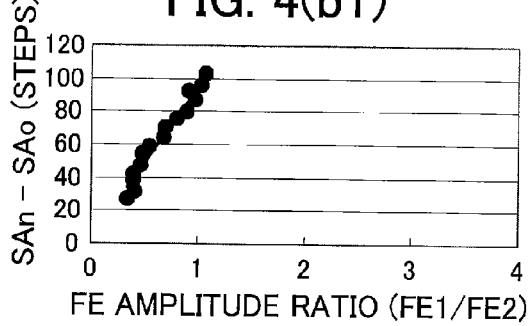
Figure 4:
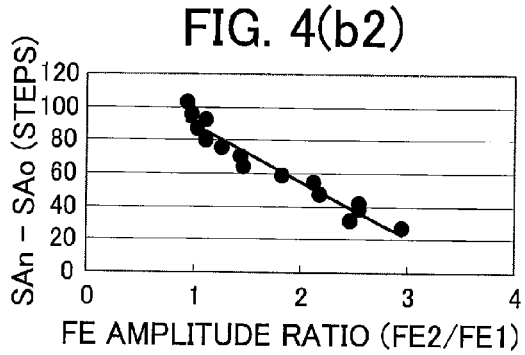
Figure 4:
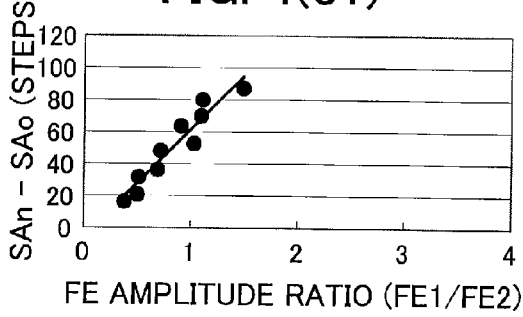
Figure 4:
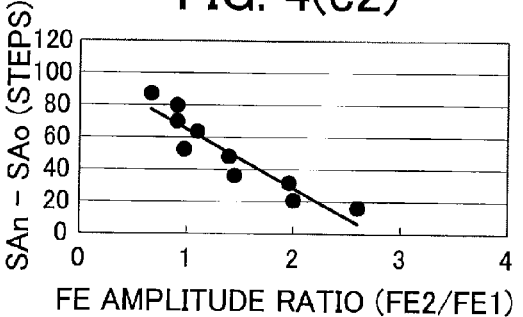

FIGS. 4(*a1*), 4(*a2*), 4(*b1*), 4(*b2*), 4(*c1*), and 4(*c2*) show results of measurements of the amplitude ratios FE1/FE2 (FIGS. 4(*a1*), 4(*b1*), 4(*c1*)) and FE2/FE1 (FIGS. 4(*a2*), 4(*b2*), 4(*c2*)) in the waveform (FIG. 3(*a*)) of the focus error signal detected when an interlayer jump is made from the first recording layer L1 to the second recording layer L2 in a dual-layer BD with the spherical aberration (SA) set to SAn. FIGS. 4(*a1*) and 4(*a2*) illustrate the case of a reproduce-only dual-layer BD; FIGS. 4(*b1*) and 4(*b2*) illustrate the case of a write-once dual-layer BD; FIGS. 4(*c1*) and 4(*c2*) illustrate the case of a rewritable dual-layer BD. The horizontal axes in these drawings indicate the amplitude ratio FE1/FE2 or FE2/FE1; the vertical axes indicate the difference (SAn−SAo) between the spherical aberration SAn and the optimal spherical aberration SAo for the second recording layer L2. From FIGS. 4(*a1*), 4(*a2*), 4(*b1*), 4(*b2*), 4(*c1*), and 4(*c2*), if the amplitude ratio of the ascending and descending S-shaped waveform peaks is denoted x, (SAn−SAo) is denoted y, and a1 and b1 are constants, the relation between x and y can be approximately represented as a linear function (first-order approximation line) by the following formula.

$$y = a1 \cdot x + b1 \tag{1}$$

Figure 5:
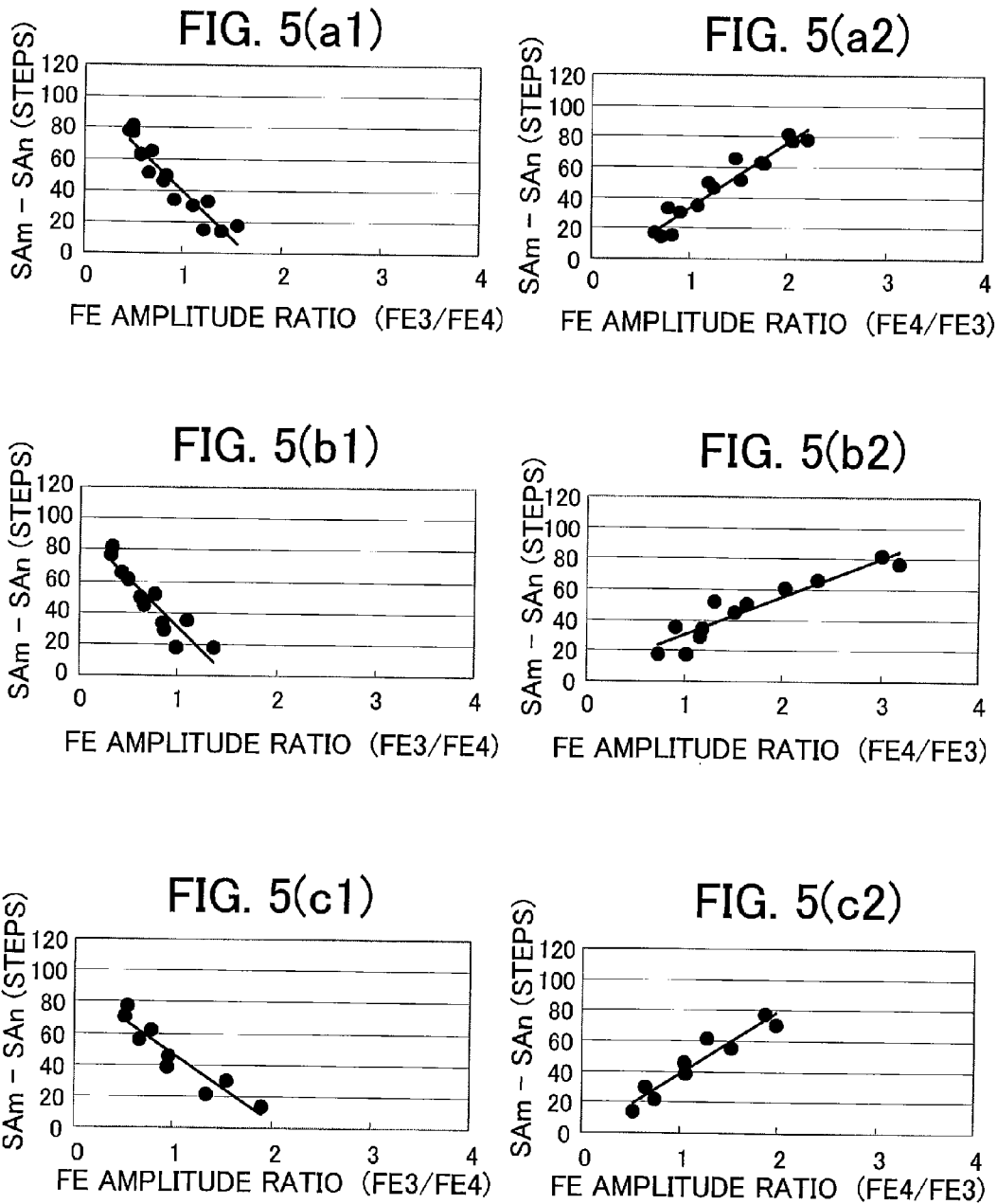
FIGS. 5(a1), 5(a2), 5(b1), 5(b2), 5(c1), and 5(c2) show results of measurements of a relation involving the amplitude ratio FE3/FE4 of the amplitude values of the ascending and descending S-shaped waveform peaks in the focus error signal detected when an interlayer jump is made from the second recording layer to the first recording layer with the spherical aberration set to SAn and the difference (SAm−SAn) between SAm (the optimal spherical aberration for the first recording layer) and SAn.

FIGS. 5(*a1*), 5(*a2*), 5(*b1*), 5(*b2*), 5(*c1*), and 5(*c2*) show the amplitude ratios FE3/FE4 (FIGS. 5(*a1*), 5(*b1*), 5(*c1*)) and FE4/FE3 (FIGS. 5(*a2*), 5(*b2*), 5(*c2*)) in the waveform (FIG. 3(*b*)) of the focus error signal detected when an interlayer jump is made from the second recording layer L2 to the first recording layer L1 in a dual-layer BD with the spherical aberration (SA) set to SAn. FIGS. 5(*a1*) and 5(*a2*) illustrate the case of a reproduce-only dual-layer BD; FIGS. 5(*b1*) and 5(*b2*) illustrate the case of a write-once dual-layer BD; FIGS. 5(*c1*) and 5(*c2*) illustrate the case of a rewritable dual-layer BD. The horizontal axes in these drawings indicate the amplitude ratio FE3/FE4 or FE4/FE3; the vertical axes indicate the difference (SAm−SAn) between SAn and the optimal spherical aberration SAm for the first recording layer L1. From FIGS. 5(*a1*), 5(*a2*), 5(*b1*), 5(*b2*), 5(*c1*), and 5(*c2*), if the amplitude ratio of the ascending and descending S-shaped waveform peaks is denoted x, (SAm−SAn) is denoted y, and a2 and b2 are constants, the relation between x and y can be approximately represented as a linear function (first-order approximation line) by the following formula.

$$y = a2 \cdot x + b2 \tag{2}$$

The constants a1 and b1 in formula (1) and the constants a2 and b2 in formula (2) are predetermined in FIGS. 4(*a*1), 4(*a*2), 4(*b*1), 4(*b*2), 4(*c*1), and 4(*c*2) and FIGS. 5(*a*1), 5(*a*2), 5(*b*1), 5(*b*2), 5(*c*1), and 5(*c*2). As is clear from these drawings, however, these constants a1, b1, a2, b2 have different values according to the type of multilayered optical disc 40; that is, they differ depending on whether the multilayered optical disc 40 is of the reproduce-only, write-once, or rewritable type. The constants a1, b1, a2, b2 must therefore be determined according to the type of multilayered optical disc 40.

The relation between the amplitude ratio of the ascending and descending S-shaped waveform peaks and the spherical aberration difference (SAn−SAo) is not restricted to a first-order approximation such as the one expressed by formula (1). Similarly, the relation between the amplitude ratio of the ascending and descending S-shaped waveform peaks and the spherical aberration difference (SAm−SAn) is not restricted to a first-order approximation such as the one expressed by formula (2). An approximation formula that minimizes the error between the approximated and measured values in FIGS. 4(*a*1), 4(*a*2), 4(*b*1), 4(*b*2), 4(*c*1), and 4(*c*2) and FIGS. 5(*a*1), 5(*a*2), 5(*b*1), 5(*b*2), 5(*c*1), and 5(*c*2) is desirable. The first-order approximation formulas (1) and (2) will be used, however, in describing the operation (optical recording/reproduction method) of the optical recording/reproduction device 10 below.

Next the operation (optical recording/reproduction method) of the optical recording/reproduction device 10 according to the first embodiment will be described in detail with reference to FIGS. 6 to 8.

Figure 6:
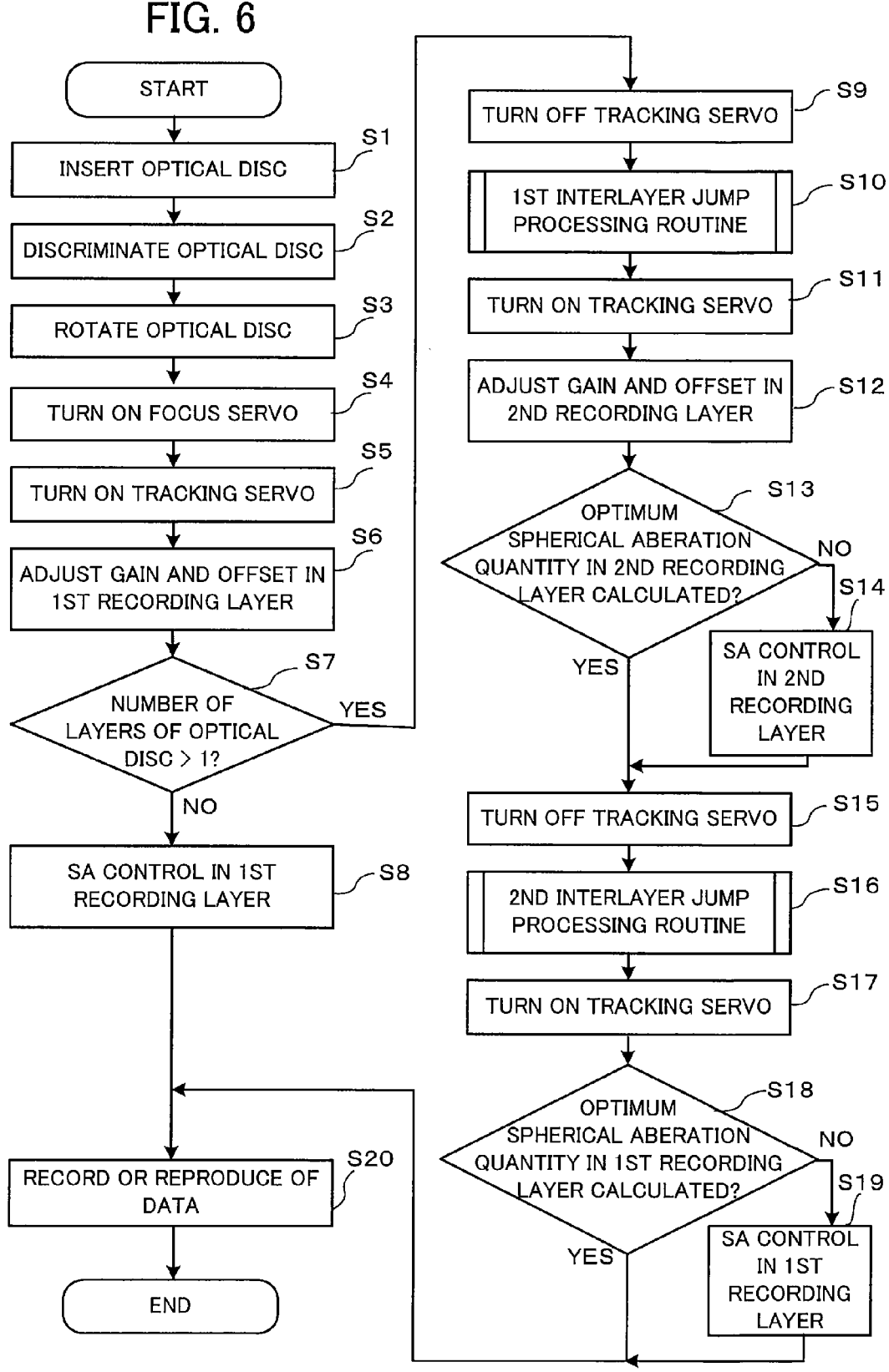
FIG. 6 is a flowchart showing an exemplary process from insertion of a multilayered optical disc into the optical recording/reproduction device in the first embodiment up to data recording or reproduction.

FIG. 6 is a flowchart showing an exemplary process from insertion of a multilayered optical disc into the optical recording/reproduction device in the first embodiment up to data recording or reproduction. When the multilayered optical disc 40 used for recording/reproduction is inserted in the optical recording/reproduction device 10 (step S1), a device (not shown) in the illumination and light reception section 1 carries out a discrimination process on the multilayered optical disc 40 (step S2). Discrimination of the multilayered optical disc 40 includes, for example, a step of deciding whether the multilayered optical disc 40 is a BD, DVD, or CD, a step of deciding whether the multilayered optical disc 40 is of the read-only, write-once, or rewritable type, and a step of determining the number of recording layers in the multilayered optical disc 40. Well known methods may be used to make these decisions in the discrimination process carried out on the inserted multilayered optical disc 40; any methods may be used.

Next, the signal processing section 2 performs control for rotating a turntable (not shown) on which the multilayered optical disc 40 is placed (step S3).

Next, the signal processing section 2 turns on the focus servo (the focus error signal generator 24*a* and the objective lens actuator 18) (step S4).

Next, the signal processing section 2 turns on the tracking servo (the tracking error signal generator 24*b* and the objective lens actuator 18) (step S5).

Next, the signal processing section 2 performs the gain and offset adjustment in the first recording layer L1 (step S6). This adjustment is performed according to the signals output from the servo signal generator 24 and reproduced signal generator 23 shown in FIG. 1. This adjustment may be performed just after the rotation of the multilayered optical disc 40 in step S3, or just after the focus servo is turned on in step S4, as necessary.

Next, the central controller 30 in the signal processing section 2 decides whether the number of recording layers in the multilayered optical disc 40 detected in step S2 is more than one (step S7). If the central controller 30 in the signal processing section 2 decides that the number of recording layers in the multilayered optical disc 40 is not more than one, the central controller 30 sends an instruction to the illumination and light reception section 1 through a device (interface, not shown) to proceed to the spherical aberration control process in the first recording layer L1 in step S7. The spherical aberration control section 3 directs the spherical aberration control element 15 and objective lens actuator 18 in the optical pickup 11 to control the spherical aberration (SA) in the first recording layer L1 (step S8). The SA control process (step S8) is a step performed by the optical pickup 11, reproduced signal amplitude detector 25, reproduction jitter detector 27, tracking error signal amplitude detector 29, central controller 30, and spherical aberration controller 32. As an example of the SA control processing method, SA is controlled so as to maximize the tracking error signal amplitude value detected from the tracking error signal amplitude detector 29; alternatively, SA is controlled so as to maximize the reproduced signal amplitude value detected from the reproduced signal amplitude detector 25 or, alternatively, so as to minimize the reproduction jitter value detected from the reproduction jitter detector 27. The optimal amount of SA control obtained in the SA control process (step S8) in the first recording layer L1 is equivalent to SAm. Next, the illumination and light reception section 1 is directed to start recording or reproducing data (step S20).

If the central controller 30 in the signal processing section 2 decides that the number of recording layers in the multilayered optical disc 40 is more than one in step S7, the central controller 30 sends an instruction to the illumination and light reception section 1 through the interface device (not shown) to proceed to the process in step S9.

In step S9, the signal processing section 2 turns off the tracking servo (the tracking error signal generator 24*b*, objective lens actuator 18, etc.) (step S9).

Next, the signal processing section 2 has the spherical aberration control element 15, objective lens 17, and objective lens actuator 18 in the optical pickup 11 execute a first interlayer jump process (step S10). The first interlayer jump processing routine (step S10) is a step performed by the optical pickup 11, focus error signal generator 24*a*, central controller 30, and spherical aberration controller 32; the details of the processing method will be described below with reference to the flowchart in FIG. 7.

Next, the signal processing section 2 turns on the tracking servo (the tracking error signal generator 24*b*, objective lens actuator 18 etc.) (step S11).

Next, the signal processing section 2 performs the gain and offset adjustment in the second recording layer L2 (step S12). This adjustment is performed according to the signals output from the servo signal generator 24 and reproduced signal generator 23 shown in FIG. 1. This adjustment may be performed just after the first interlayer jump processing routine in step S10, as necessary.

Next, the signal processing section 2 decides whether the optimal spherical aberration SAo in the second recording layer L2 has been calculated (step S13). The optimal spherical aberration SAo in the second recording layer L2 is calculated from the amplitude ratio FE1/FE2 of the amplitude values FE1 and FE2 in FIG. 3(*a*) in the first interlayer jump processing (step S10) described below; if this calculation could not be carried out, the spherical aberration control section 3 directs the spherical aberration control element 15 and objective lens actuator 18 in the optical pickup 11 to control the spherical aberration (SA) in the second recording layer L2 (step S14). The SA control process in the second recording layer L2 (step S14) is similar to the SA control process in the first recording layer L1 (step S8). The optimal amount of SA control obtained in the SA control process (step S14) in the second recording layer L2 is equivalent to SAo.

Next, the signal processing section 2 turns off the tracking servo (the tracking error signal generator 24b, objective lens actuator 18, etc.) (step S15).

Next, the signal processing section 2 has the spherical aberration control element 15, objective lens 17, and objective lens actuator 18 in the optical pickup 11 execute a second interlayer jump process (step S16). The second interlayer jump processing routine (step S16) is a step performed by the optical pickup 11, focus error signal generator 24a, central controller 30, and spherical aberration controller 32; the details of the processing method will be described below with reference to the flowchart in FIG. 8.

Next, the signal processing section 2 turns on the tracking servo (the tracking error signal generator 24b, objective lens actuator 18, etc.) (step S17).

Next, the signal processing section 2 decides whether the optimal spherical aberration SAm in the first recording layer L1 has been calculated (step S18). The optimal spherical aberration SAm in the first recording layer L1 is calculated from the amplitude ratio of the amplitude values FE3 and FE4 in FIG. 3(b) in the first interlayer jump processing (step S16) described below; if this calculation could not be carried out, the spherical aberration control section 3 directs the spherical aberration control element 15 and objective lens actuator 18 in the optical pickup 11 to control the spherical aberration (SA) in the first recording layer L1 (step S19). The SA control process in the first recording layer L1 (step S19) is similar to the SA control process in the first recording layer L1 (step S8). The optimal amount of SA control obtained in the SA control process (step S19) in the first recording layer L1 is equivalent to SAm.

Next, the interface device (not shown) sends an instruction to the illumination and light reception section 1 causing the illumination and light reception section 1 to start recording or reproducing data (step S20).

Figure 7:
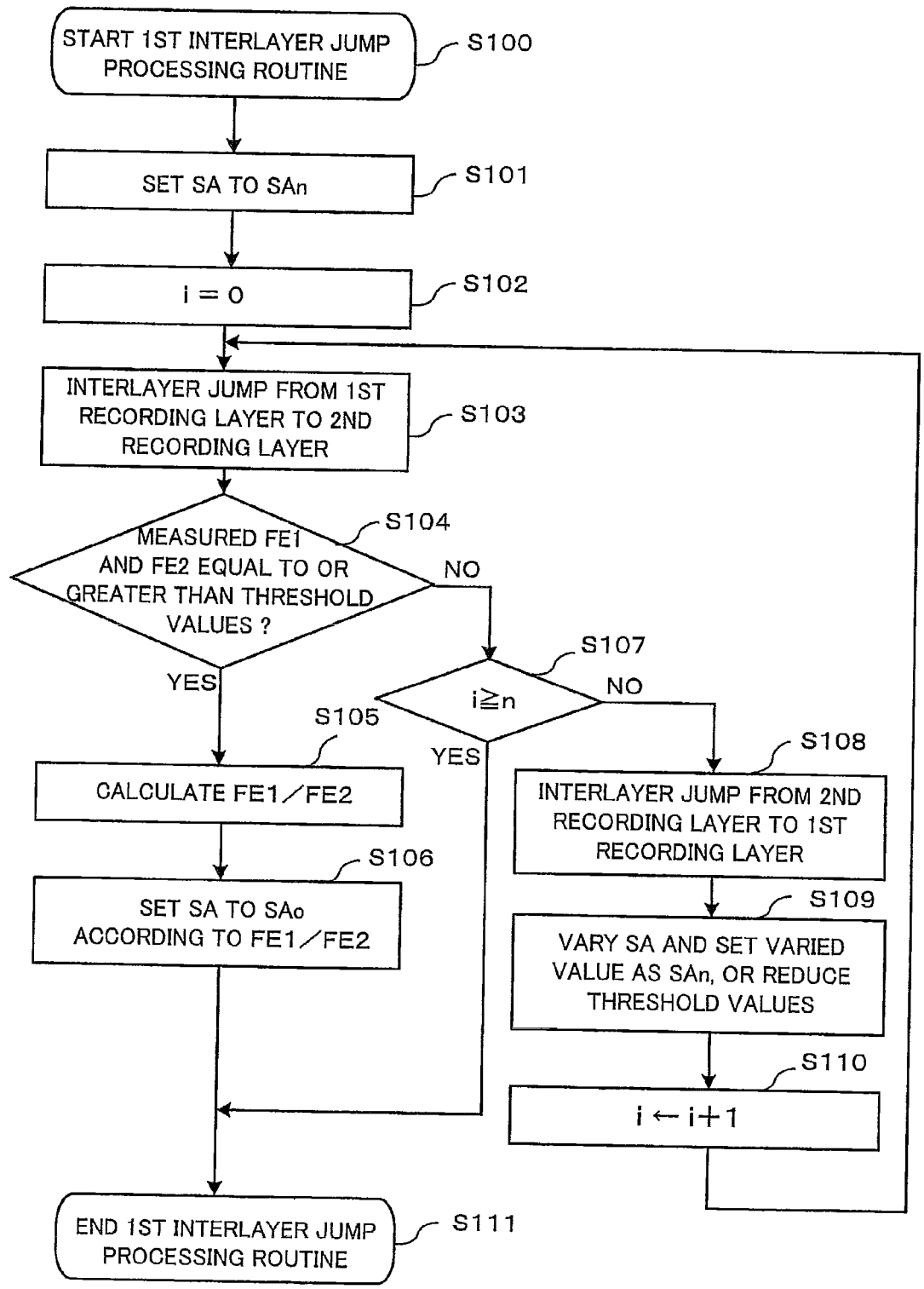
FIG. 7 is a flowchart showing an exemplary first interlayer jump processing routine in the optical recording/reproduction device in the first embodiment.

FIG. 7 is a flowchart showing an exemplary first interlayer jump processing routine in the optical recording/reproduction device 10 in the first embodiment. FIG. 7 illustrates details of the first interlayer jump processing routine in step S10 in FIG. 6.

As shown in FIG. 7, when the first interlayer jump processing routine starts (step S100), the spherical aberration control section 3 sets the spherical aberration (SA) to SAn (step S101). This SAn may be the appropriate amount of spherical aberration for the second recording layer L2 as previously obtained on a standard disc, or a value between the appropriate amounts of spherical aberration for the first recording layer L1 and second recording layer L2. This setting enables a stable interlayer jump to be made from the first recording layer L1 to the second recording layer L2.

Next, the signal processing section 2 sets i to 0 (step S102). The process for setting i to 0 (step S102) is performed by the central controller 30 etc.

Next, the illumination and light reception section 1 makes an interlayer jump from the first recording layer L1 to the second recording layer L2 (step S103). The interlayer jump (step S103) is made by the optical pickup 11, focus error signal generator 24a, and central controller 30.

Next, the signal processing section 2 measures the amplitude values FE1 and FE2 in the focus error signal detected when the interlayer jump is made from the first recording layer L1 to the second recording layer L2 (step S103), and decides whether one or both of the measured amplitude values FE1 and FE2 are equal to or greater than the threshold values shown in FIG. 3(a) (step S104). If the decision in step S104 is Yes, the ratio FE1/FE2 of the amplitude values FE1 and FE2 is calculated (step S105). If the decision in step S104 is No, the signal processing section 2 decides whether i is equal to or greater than n (step S107).

If the decision in step S104 is Yes, the signal processing section 2 calculates the amplitude ratio FE1/FE2 from the amplitude values FE1 and FE2 measured in step S104 (step S105). The step of calculating the amplitude ratio FE1/FE2 (step S105) is performed by the central controller 30.

Next, on the basis of the amplitude ratio FE1/FE2 calculated in step S105, the spherical aberration control section 3 sets the spherical aberration (SA) to SAo (step S106). The step of setting the spherical aberration to SAo (step S106) is performed by the optical pickup 11, central controller 30, and spherical aberration controller 32.

Next, the first interlayer jump processing routine ends (step S111).

If the decision in step S104 is No, the signal processing section 2 decides whether i is equal to or greater than n (step S107). If the decision in step S107 is Yes, which indicates that one or both of the amplitude values FE1 and FE2 are not equal to or greater than the threshold values despite n interlayer jumps made from the first recording layer L1 to the second recording layer L2 (step S103), the first interlayer jump processing routine ends in the state in which the optimal amount of spherical aberration SAo in the second recording layer L2 has not been calculated (step S111).

If the decision in step S107 is No, the signal processing section 2 makes an interlayer jump from the second recording layer L2 to the first recording layer L1 (step S108). The purpose of this process is to make another interlayer jump from the first recording layer L1 to the second recording layer L2 (step S103) because of the decision in step S104 that one or both of the amplitude values FE1 and FE2 are not equal to or greater than the threshold values.

Next, the spherical aberration control section 3 varies the spherical aberration (SA). Simultaneously, the signal processing section 2 sets the varied value as SAn (step S109) or, alternatively, reduces the threshold values in FIG. 3(a). The process of varying the spherical aberration (SA) and setting the varied value as SAn or reducing the threshold values (step S109) is performed by the optical pickup 11, central controller 30, and spherical aberration controller 32.

The reason for varying the spherical aberration (SA) (step S109) in the first embodiment is the failure of one of the amplitude values FE1 and FE2 in the focus error signal (FIG. 3(a)) detected during the time of the interlayer jump made from the first recording layer L1 to the second recording layer L2 (step S103) to reach the threshold value. That is, the reason is that the value of the spherical aberration SAn set when the interlayer jump was made was closer to the appropriate amount of spherical aberration for the first recording layer L1, or closer to the appropriate amount of spherical aberration for the second recording layer L2. Therefore, if the set value is closer to the appropriate amount of the spherical aberration for the first recording layer L1, the value is varied to approach the appropriate amount of the spherical aberration for the second recording layer L2; if the value is closer to the appropriate amount of the spherical aberration for the second recording layer L2, the value is varied to approach the appropriate amount of the spherical aberration for the first recording layer L1. The size of the variation may be set freely.

In step S109, the threshold values in FIG. 3(a) may be reduced. This is an effective process when both of the amplitude values FE1 and FE2 in the focus error signal (FIG. 3(a)) detected during the time of an interlayer jump made from the first recording layer L1 to the second recording layer L2 (step S103) fail to reach the threshold value. It is necessary to select the threshold values appropriately, however, so that when another interlayer jump is made from the first recording layer L1 to the second recording layer L2 (step S103), waveform peaks with voltage changes equal to or greater than the threshold values do not appear more than twice.

Next, the signal processing section 2 increases the value of i by one (step S110). The process of increasing the value of i by one (step S110) is performed by the central controller 30 etc. After the process in step S110 has been performed, another interlayer jump is made from the first recording layer L1 to the second recording layer L2 (step S103).

If x denotes the amplitude ratio FE1/FE2 and y denotes the difference (SAn−SAo) between SAn and SAo in the linear function (first-order approximation line) given by the following formula, $$y = a1 \cdot x + b1 \quad (1)$$

the step of setting the spherical aberration (SA) to SAo on the basis of the ratio FE1/FE2 of the amplitude values FE1 and FE2 of the ascending and descending S-shaped waveform peaks (step S106) includes a step of approximating (SAn−SAo), that is, approximating SAo, from the amplitude ratio FE1/FE2. After the interlayer jump is performed, optimal spherical aberration control can thereby be carried out in a short time for the second recording layer L2 onto which the laser light is focused.

FIG. 8 is a flowchart showing an exemplary second interlayer jump processing routine in the optical recording/reproduction device 10 in the first embodiment. FIG. 8 illustrates details of the second interlayer jump processing routine in step S16 in FIG. 6.

As shown in FIG. 8, when the second interlayer jump processing routine starts (step S160), the spherical aberration control section 3 sets the spherical aberration (SA) to SAn (step S161). This SAn may be the appropriate amount of spherical aberration for the first recording layer L1 as previously obtained on a standard disc, or a value between the appropriate amount of spherical aberration for the first recording layer L1 and the appropriate amount of spherical aberration SAo calculated in step S10 for second recording layer L2. This setting enables a stable interlayer jump to be made from the second recording layer L2 to the first recording layer L1.

Next, the signal processing section 2 sets i to 0 (step S162). The process for setting i to 0 (step S162) is performed by the central controller 30 etc.

Next, the illumination and light reception section 1 makes an interlayer jump from the second recording layer L2 to the first recording layer L1 (step S163). The interlayer jump (step S163) is made by the optical pickup 11, focus error signal generator 24a, and central controller 30.

Next, the signal processing section 2 measures the amplitude values FE3 and FE4 in the focus error signal detected when the interlayer jump is made from the second recording layer L2 to the first recording layer L1 (step S163), and decides whether one or both of the measured amplitude values FE3 and FE4 are equal to or greater than the threshold values shown in FIG. 3(b) (step S164). If the decision in step S164 is Yes, the ratio FE4/FE3 of the amplitude values FE3 and FE4 is calculated (step S165). If the decision in step S164 is No, the signal processing section 2 decides whether i is equal to or greater than n (step S167).

If the decision in step S164 is Yes, the signal processing section 2 calculates the amplitude ratio FE4/FE3 from the amplitude values FE3 and FE4 measured in step S164 (step S165). The step of calculating the amplitude ratio FE4/FE3 (step S165) is performed by the central controller 30.

Next, on the basis of the amplitude ratio FE4/FE3 calculated in step S165, the spherical aberration control section 3 sets the spherical aberration (SA) to SAm (step S166). The step of setting the spherical aberration (SA) to SAm (step S166) is performed by the optical pickup 11, central controller 30, and spherical aberration controller 32.

Next, the second interlayer jump processing routine ends (step S171).

If the decision in step S164 is No, the signal processing section 2 decides whether i is equal to or greater than n (step S167). If the decision in step S167 is Yes, which indicates that one or both of the amplitude values FE3 and FE4 are not equal to or greater than the threshold values despite n interlayer jumps made from the second recording layer L2 to the first recording layer L1 (step S163), the second interlayer jump processing routine ends in the state in which the optimal amount of spherical aberration SAm in the first recording layer L1 has not been calculated (step S171).

If the decision in step S167 is No, the signal processing section 2 makes an interlayer jump from the first recording layer L1 to the second recording layer L2 (step S168). The purpose of this process is to make another interlayer jump from the second recording layer L2 to the first recording layer L1 (step S163) because of the decision in step S164 that one or both of the amplitude values FE3 and FE4 are not equal to or greater than the threshold values.

Next, the spherical aberration control section 3 varies the spherical aberration (SA). Simultaneously, the signal processing section 2 sets the varied value as SAn (step S169) or, alternatively, reduces the threshold values in FIG. 3(b). The process of varying the spherical aberration (SA) and setting the varied value as SAn or reducing the threshold values (step S169) is performed by the optical pickup 11, central controller 30, and spherical aberration controller 32.

The reason for varying the spherical aberration (SA) (step S169) in the first embodiment is the failure of one of the amplitude values FE3 and FE4 in the focus error signal (FIG. 3(b)) detected during the time of the interlayer jump made from the second recording layer L2 to the first recording layer L1 (step S163) to reach the threshold value. That is, the reason is that the value of the spherical aberration SAn set when the interlayer jump was made was closer to the appropriate amount of spherical aberration for the first recording layer L1, or closer to the appropriate amount of spherical aberration SAo calculated in step S10 for the second recording layer L2. Therefore, if the set value is closer to the appropriate amount of the spherical aberration for the first recording layer L1, the value is varied to approach SAo; if the value is closer to SAo, the value is varied to approach the appropriate amount of the spherical aberration for the first recording layer L1. The size of the variation may be set freely.

In step S169, the threshold values in FIG. 3(b) may be reduced. This is an effective process when both of the amplitude values FE3 and FE4 in the focus error signal (FIG. 3(b)) detected during the time of an interlayer jump made from the second recording layer L2 to the first recording layer L1 (step S163) fail to reach the threshold value. It is necessary to select appropriate threshold values, however, such that when another interlayer jump is made from the second recording layer L2 to the first recording layer L1 (step S163), waveform peaks with voltage changes equal to or greater than the threshold values do not appear more than twice.

Next, the signal processing section 2 increases the value of i by one (step S170). The process of increasing the value of i by one (step S170) is performed by the central controller 30 etc. After the process in step S170 has been performed, another interlayer jump is made from the second recording layer L2 to the first recording layer L1 (step S163).

If x denotes the amplitude ratio FE4/FE3 and y denotes the difference (SAm−SAn) between SAm and SAn in the linear function (first-order approximation line) given by the following formula, $$y=a2\cdot x+b2 \qquad (2)$$

the step of setting the spherical aberration (SA) to SAm on the basis of the ratio FE3/FE4 of the amplitude values FE3 and FE4 of the ascending and descending S-shaped waveform peaks (step S166) includes a step of approximating (SAm−SAn), that is, approximating SAm, from the amplitude ratio FE4/FE3. After the interlayer jump is performed, optimal spherical aberration control can thereby be carried out in a short time for the first recording layer L1 onto which the laser light is focused.

In a device for recording on and/or reproducing from a multilayered optical disc 40, optimal spherical aberration control can be carried out in a short time for the first recording layer L1 and the second recording layer L2 in a dual-layer BD according to the optical recording/reproduction device 10 and the optical recording/reproduction method in the first embodiment as described above.

Although the amplitude ratio FE1/FE2 of the amplitude values FE1 and FE2 is used in steps S105 and S106 in FIG. 7 in the description above, the amplitude ratio FE2/FE1 may be used. Similarly, although the amplitude ratio FE4/FE3 of the amplitude values FE3 and FE4 is used in steps S165 and S166 in FIG. 8, the amplitude ratio FE3/FE4 may be used.

Although the interlayer jump from the second recording layer L2 to the first recording layer L1 was described as an interlayer jump from a second recording layer to a first recording layer in FIG. 3(b), the interlayer jump from the second recording layer L2 to the first recording layer L1 can also be described in a general way as an interlayer jump from a first recording layer to a second recording layer. The optimal amount of spherical aberration at the destination of an interlayer jump can be therefore calculated on the basis of the ratio of amplitude values equal to or greater than the threshold values in one waveform of the focus error signal detected during an interlayer jump made from the first recording layer L1 to the second recording layer L2 in FIG. 3(a) and on the basis of the ratio of amplitude values equal to or greater than the threshold values in another waveform of the focus error signal detected during an interlayer jump made from the second recording layer L2 to the first recording layer L1 in FIG. 3(b).

Second Embodiment

In the first embodiment, a method of calculating the optimal amount of spherical aberration at the destination of an interlayer jump from a first recording layer L1 to a second recording layer L2 in a dual-layer BD on the basis of the ratio of two amplitude values of the focus error signal detected during the interlayer jump was described. The interlayer jump is a process of moving the position of the focused spot of laser light directed onto an information recording surface of the multilayered optical disc 40 by displacing the objective lens 17 in the focusing direction. The optimal amount of spherical aberration can be calculated by displacing the objective lens 17 in the focusing direction not only in an interlayer jump but also during discrimination of the multilayered optical disc 40, when the focus servo is turned on, and at other times.

The optical recording/reproduction device in the second embodiment is similar in structure to the optical recording/reproduction device in the first embodiment, described in FIG. 1. FIGS. 1 and 2 will therefore also be referred to in the description of the second embodiment.

Figure 9A:
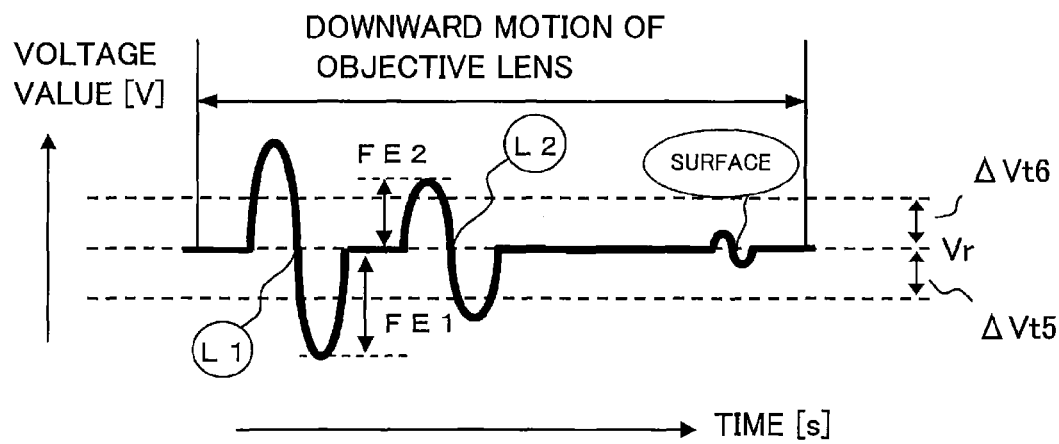
FIG. 9(a) shows an exemplary waveform of the focus error signal detected when the objective lens is moved in the direction away from the multilayered optical disc, which is a dual-layer BD.
Figure 9B:
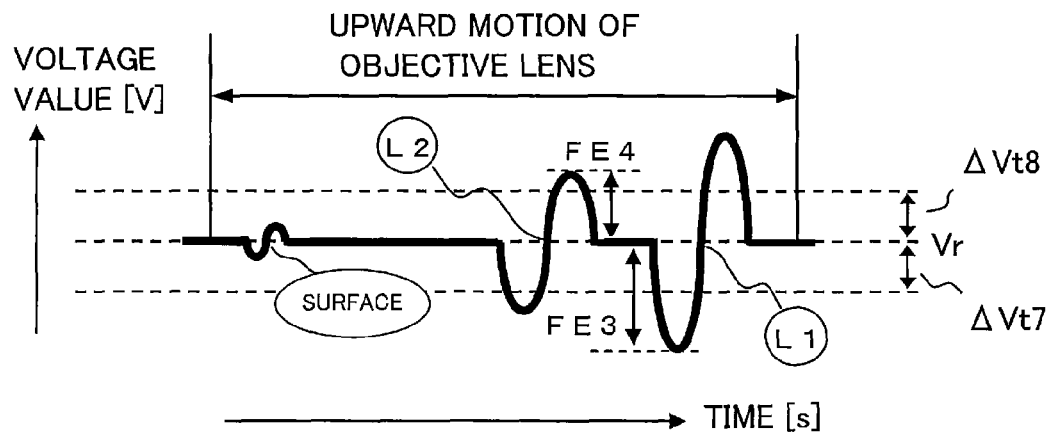
FIG. 9(b) shows an exemplary waveform of the focus error signal detected when the objective lens is moved in the direction toward the multilayered optical disc, which is a dual-layer BD.

FIG. 9(a) shows an exemplary focus error signal detected when the objective lens 17 is moved in the direction away from the multilayered optical disc 40, perpendicularly to the multilayered optical disc 40, passing through the focal positions of all the recording layers of the multilayered optical disc 40, after the multilayered optical disc 40 has been inserted into the optical recording/reproduction device; FIG. 9(b) shows an exemplary focus error signal detected when the objective lens 17 is moved in the direction toward the multilayered optical disc 40, perpendicularly to the multilayered optical disc 40.

When the objective lens 17 is moved in the direction away from the multilayered optical disc 40 (downward in FIG. 1), just before the objective lens 17 passes through the focal position of the first recording layer L1 (the point indicated by the circled L1 in FIG. 9(a)), an ascending S-shaped waveform appears in FIG. 9(a), and just after the objective lens 17 passes through the focal position, the descending S-shaped waveform appears. Just before the objective lens 17 passes through the focal position of the second recording layer L2 (the point indicated by the circled L2 in FIG. 9(a)), another ascending S-shaped waveform appears, and just after the objective lens 17 passes through the focal position, the descending S-shaped waveform appears. Just before the objective lens 17 passes through the surface, still another ascending S-shaped waveform appears, and just after the objective lens 17 passes through the surface, the descending S-shaped waveform appears. The amplitude value of the descending S-shaped waveform peak that appears just after the objective lens 17 passes through the focal position of the first recording layer L1 will be denoted FE1; the amplitude value of the ascending S-shaped waveform peak that appears just before the objective lens 17 passes through the focal position of the second recording layer L2 will be denoted FE2.

When the objective lens 17 is moved in the direction toward the multilayered optical disc 40 (upward in FIG. 1), just before the objective lens 17 passes through the surface, a descending S-shaped waveform appears in FIG. 9(b), and just after the objective lens 17 passes through the surface, the ascending S-shaped waveform appears. Just before the objective lens 17 passes through the focal position of the second recording layer L2 (the point indicated by the circled L2 in FIG. 9(b)), another descending S-shaped waveform appears, and just after the objective lens 17 passes through the focal position, the ascending S-shaped waveform appears. Just before the objective lens 17 passes through the focal position of the first recording layer L1 (the point indicated by the circled L1 in FIG. 9(b)), still another descending S-shaped waveform appears, and just after the objective lens 17 passes through the focal position, the ascending S-shaped waveform appears. The amplitude value of the ascending S-shaped waveform peak that appears just after the objective lens 17 passes through the focal position of the second recording layer L2 will be denoted FE4; the amplitude value of the descending S-shaped waveform peak that appears just before the objective lens 17 passes through the focal position of the first recording layer L1 will be denoted FE3.

In the waveform shown in FIG. 9(a), the change in voltage from the reference voltage Vr obtained when the objective lens 17 is not moved in the direction away from the multilayered optical disc 40 is measured at certain sampling intervals and compared with the threshold value ΔVt5 or ΔVt6, and the amplitude values FE1 and FE2 are amplitudes of the waveform measured when the voltage change is equal to or greater than the threshold value. More specifically, when the objective lens 17 is moved in the direction away from the multilayered optical disc 40, FE1 is the amplitude value the second time the change in voltage from the reference value becomes equal to or greater than the threshold value, and FE2 is the amplitude value the third time the change becomes equal to or greater than the threshold value. Although the threshold value ΔVt5 or ΔVt6 may be set freely, it is necessary to select appropriate threshold values such that waveform peaks with voltage changes equal to or greater than a threshold value do not appear more than four times when the focal position moves.

Similarly, in the waveform shown in FIG. 9(b), the change in voltage from the reference voltage Vr obtained when the objective lens 17 is not moved in the direction toward the multilayered optical disc 40 is measured at certain sampling intervals and compared with the threshold value ΔVt7 or ΔVt8, and the amplitude values FE3 and FE4 are amplitudes of the waveform measured when the voltage change is equal to or greater than the threshold value. More specifically, when the objective lens 17 is moved in the direction toward the multilayered optical disc 40, FE4 is the amplitude value the second time the change in voltage from the reference value becomes equal to or greater than the threshold value, and FE3 is the amplitude value the third time the change becomes equal to or greater than the threshold value. Although the threshold value ΔVt7 or ΔVt8 may be set freely, it is necessary to select appropriate threshold values such that waveform peaks with voltage changes equal to or greater than a threshold value do not appear more than four times when the focal position moves.

The waveform of the focus error signal detected when the objective lens 17 is moved in the direction away from the multilayered optical disc 40 and the waveform of the focus error signal detected when the objective lens 17 is moved in the direction toward the multilayered optical disc 40 are not restricted to waveforms like the ones shown in FIGS. 9(a) and 9(b).

Figure 10:
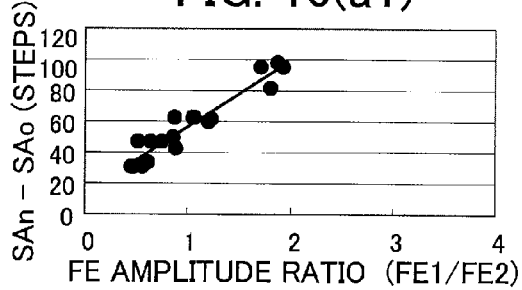
FIGS. 10(a1), 10(a2), 10(b1), 10(b2), 10(c1) and 10(c2) show results of measurements of the relation of the amplitude ratio FE1/FE2 of the ascending and descending S-shaped waveform peaks in the focus error signal detected when the objective lens is moved in the direction away from the multilayered optical disc with the spherical aberration set to SAn and the difference (SAn−SAo) between SAn and SAo (the optimal spherical aberration for the second recording layer).
Figure 10:
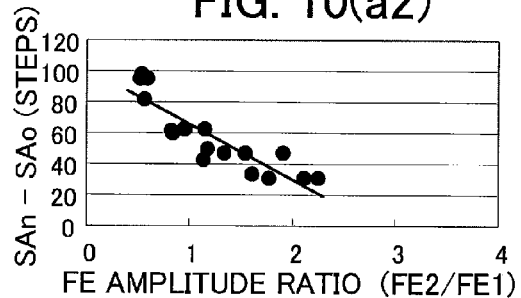
Figure 10:
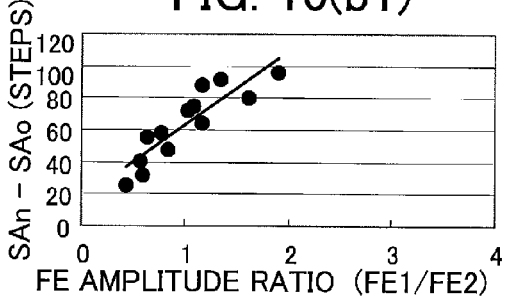
Figure 10:
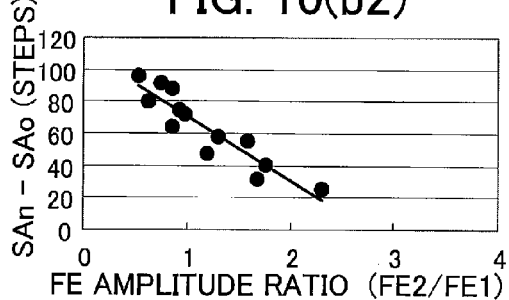
Figure 10:
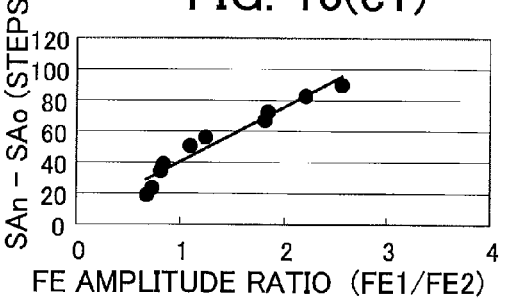
Figure 10:
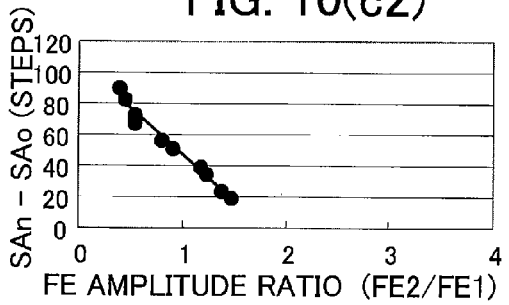

FIGS. 10(a1), 10(a2), 10(b1), 10(b2), 10(c1), and 10(c2) show results of measurements of the amplitude ratios FE1/FE2 (FIGS. 10(a1), 10(b1), 10(c1)) and FE2/FE1 (FIGS. 10(a2), 10(b2), 10(c2)) of the amplitude values FE1 and FE2 of the ascending and descending S-shaped waveform peaks (FIG. 9(a)) of the focus error signal detected when the objective lens 17 is moved in the direction away from the multilayered optical disc 40 in a dual-layer BD with the spherical aberration set to SAn. FIGS. 10(a1) and 10(a2) illustrate the case of a reproduce-only dual-layer BD; FIGS. 10(b1) and 10(b2) illustrate the case of a write-once dual-layer BD; FIGS. 10(c1) and 10(c2) illustrate the case of a rewritable dual-layer BD. The horizontal axes indicate the amplitude ratio FE1/FE2 of the amplitude values FE1 and FE2 of the ascending and descending S-shaped waveform peaks; the vertical axes indicate the difference (SAn−SAo) between SAn and the optimal spherical aberration SAo for the second recording layer L2. From FIGS. 10(a1), 10(a2), 10(b1), 10(b2), 10(c1), and 10(c2), if the amplitude ratio of the ascending and descending S-shaped waveform peaks is denoted x, (SAn−SAo) is denoted y, and a3 and b3 are constants, the relation between x and y can be approximately represented as a linear function (first-order approximation line) by the following formula.

$$y = a3 \cdot x + b3 \tag{3}$$

Figure 11:
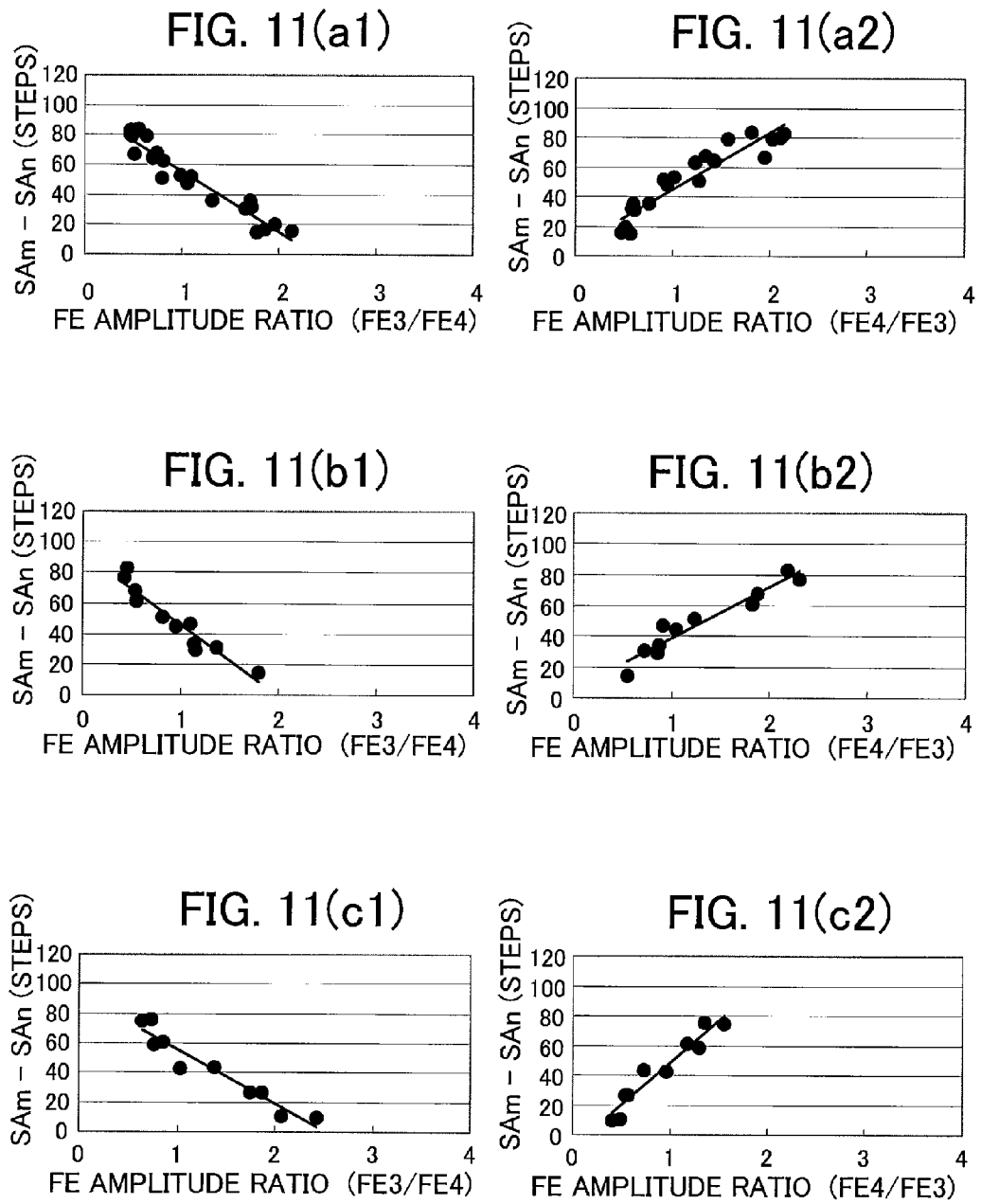
FIGS. 11(a1), 11(a2), 11(b1), 11(b2), 11(c1) and 11(c2) show results of measurements of the relation of the amplitude ratio FE3/FE4 of the ascending and descending S-shaped waveform peaks in the focus error signal detected when the objective lens is moved in the direction toward the multilayered optical disc with the spherical aberration set to SAn and the difference (SAm−SAn) between SAm (the optimal spherical aberration for the first recording layer) and SAn.

FIGS. 11(a1), 11(a2), 11(b1), 11(b2), 11(c1), and 11(c2) show results of measurements of the amplitude ratios FE3/FE4 (FIGS. 11(a1), 11(b1), 11(c1)) and FE4/FE3 (FIGS. 11(a2), 11(b2), 11(c2)) of the amplitude values FE3 and FE4 of the ascending and descending S-shaped waveform peaks (FIG. 9(b)) of the focus error signal detected when the objective lens 17 is moved in the direction toward the multilayered optical disc 40 in a dual-layer BD with the spherical aberration set to SAn. FIGS. 11(a1) and 11(a2) illustrate the case of a reproduce-only dual-layer BD; FIGS. 11(b1) and 11(b2) illustrate the case of a write-once dual-layer BD; FIGS. 11(c1) and 11(c2) illustrate the case of a rewritable dual-layer BD. The horizontal axes indicate the amplitude ratio of the amplitude values FE3 and FE4 of the ascending and descending S-shaped waveform peaks; the vertical axes indicate the difference (SAm−SAn) between SAn and the optimal spherical aberration SAm for the first recording layer L1. From FIGS. 11(a1), 11(a2), 11(b1), 11(b2), 11(c1), and 11(c2), if the amplitude ratio of the ascending and descending S-shaped waveform peaks is denoted x, (SAm−SAn) is denoted y, and a4 and b4 are constants, the relation between x and y can be approximately represented as a linear function (first-order approximation line) by the following formula.

$$y = a4 \cdot x + b4 \tag{4}$$

The constants a3 and b3 in formula (3) and the constants a4 and b4 in formula (4) are predetermined in FIGS. 10(a1), 10(a2), 10(b1), 10(b2), 10(c1), and 10(c2) and FIGS. 11(a1), 11(a2), 11(b1), 11(b2), 11(c1), and 11(c2). As is clear from these drawings, however, these constants a3, b3, a4, b4 have different values according to the type of multilayered optical disc 40; that is, they differ depending on whether the multilayered optical disc 40 is of the reproduce-only, write-once, or rewritable type. The constants a3, b3, a4, b4 must therefore be determined according to the type of multilayered optical disc 40.

The relation between the amplitude ratio of the ascending and descending S-shaped waveform peaks and the spherical aberration difference (SAn−SAo) is not restricted to a first-order approximation such as the one expressed by formula (3); similarly, the relation between the amplitude ratio of the ascending and descending S-shaped waveform peaks and the spherical aberration difference (SAm−SAn) is not restricted to a first-order approximation such as the one expressed by formula (4). An approximation formula that minimizes the error between the approximated and measured values in FIGS. 10(a1), 10(a2), 10(b1), 10(b2), 10(c1), and 10(c2) and FIGS. 11(a1), 11(a2), 11(b1), 11(b2), 11(c1), and 11(c2) is desirable. The first-order approximation formulas (3) and (4) will be used, however, in describing the operation (optical recording/reproduction method) of the optical recording/reproduction device 10 below.

Next the operation (optical recording/reproduction method) of the optical recording/reproduction device 10 according to the second embodiment will be described in detail with reference to FIGS. 12 to 15.

Figure 12:
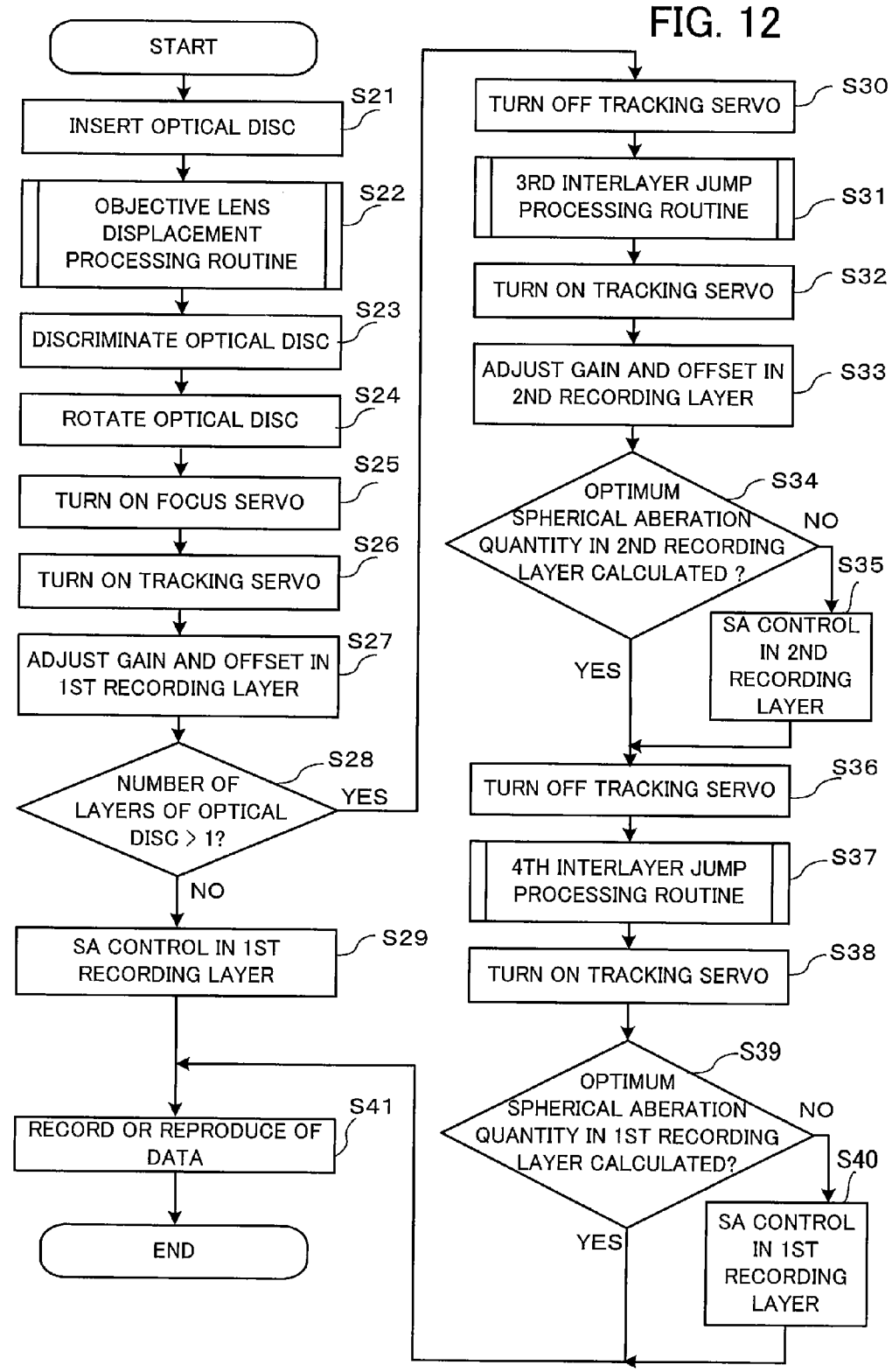
FIG. 12 is a flowchart showing an exemplary process from insertion of a multilayered optical disc into the optical recording/reproduction device in the second embodiment up to data recording or reproduction.

FIG. 12 is a flowchart showing an exemplary process from insertion of a multilayered optical disc into the optical recording/reproduction device in the second embodiment up to data recording or reproduction. When the multilayered optical disc 40 used for recording/reproduction is inserted in the optical recording/reproduction device 10 (step S21), the signal processing section 2 has the objective lens 17 and objective lens actuator 18 execute an objective lens displacement process (step S22). The objective lens displacement processing routine (step S22) is a step performed by the optical pickup 11, focus error signal generator 24a, and central controller 30; the details of the processing method will be described below with reference to the flowchart in FIG. 13.

Next, a device (not shown) in the illumination and light reception section 1 carries out a discrimination process on the multilayered optical disc 40 (step S23). Discrimination of the multilayered optical disc 40 includes, for example, a step of deciding whether the multilayered optical disc 40 is a BD, DVD, or CD, a step of deciding whether the multilayered optical disc 40 is of the read-only, write-once, or rewritable type, and a step of determining the number of recording layers in the multilayered optical disc 40. Methods for making these decisions in the discrimination process carried out on the inserted multilayered optical disc 40 are well known; any methods may be used to make these decisions.

Next, the signal processing section 2 performs control for rotating the multilayered optical disc 40, and rotates a turntable (not shown) (step S24).

Next, the signal processing section 2 turns on the focus servo (the focus error signal generator 24a and the objective lens actuator 18) (step S25).

Next, the signal processing section 2 turns on the tracking servo (the tracking error signal generator 24b and the objective lens actuator 18) (step S26).

Next, the signal processing section 2 performs the gain and offset adjustment in the first recording layer L1 (step S27). This adjustment is performed according to the signals output from the servo signal generator 24 and reproduced signal generator 23 shown in FIG. 1. This adjustment may be performed just after the rotation of the multilayered optical disc 40 in step S24, or just after the focus servo is turned on in step S25, as necessary.

Next, the central controller 30 in the signal processing section 2 decides whether the number of recording layers in the multilayered optical disc 40 detected in step S23 is more than one (step S28). If the central controller 30 in the signal processing section 2 decides that the number of recording layers in the multilayered optical disc 40 is not more than one, the central controller 30 sends an instruction to the illumination and light reception section 1 through a device (interface, not shown) to proceed to the spherical aberration control process in the first recording layer L1 in step S29. The spherical aberration control section 3 directs the spherical aberration control element 15 and objective lens actuator 18 in the optical pickup 11 to control the spherical aberration (SA) in the first recording layer L1 (step S29). The SA control process (step S29) is a step performed by the optical pickup 11, reproduced signal amplitude detector 25, reproduction jitter detector 27, tracking error signal amplitude detector 29, central controller 30, and spherical aberration controller 32. As an example of the SA control processing method, SA is controlled so as to maximize the tracking error signal amplitude value detected from the tracking error signal amplitude detector 29; alternatively, SA is controlled so as to maximize the reproduced signal amplitude value detected from the reproduced signal amplitude detector 25 or, alternatively, so as to minimize the reproduction jitter value detected from the reproduction jitter detector 27. The optimal amount of SA control obtained in the SA control process (step S29) in the first recording layer L1 is equivalent to SAm. Next, the illumination and light reception section 1 is directed to start recording or reproducing data (step S41).

If the central controller 30 in the signal processing section 2 decides that the number of recording layers in the multilayered optical disc 40 is more than one in step S28, the central controller 30 sends an instruction to the illumination and light reception section 1 through the interface device (not shown).

Next, the signal processing section 2 turns off the tracking servo (the tracking error signal generator 24b, objective lens actuator 18, etc.) (step S30).

Next, the signal processing section 2 has the spherical aberration control element 15, objective lens 17, and objective lens actuator 18 in the optical pickup 11 execute a third interlayer jump process (step S31). The third interlayer jump processing routine (step S31) is a step performed by the optical pickup 11, focus error signal generator 24a, central controller 30, and spherical aberration controller 32; the details of the processing method will be described below with reference to the flowchart in FIG. 14.

Next, the signal processing section 2 turns on the tracking servo (the tracking error signal generator 24b, objective lens actuator 18 etc.) (step S32).

Next, the signal processing section 2 performs the gain and offset adjustment in the second recording layer L2 (step S33). This adjustment is performed according to the signals output from the servo signal generator 24 and reproduced signal generator 23 shown in FIG. 1. This adjustment may be performed just after the third interlayer jump processing routine in step S31, as necessary.

Next, the signal processing section 2 decides whether the optimal spherical aberration SAo in the second recording layer L2 has been calculated (step S34). The optimal spherical aberration SAo in the second recording layer L2 is calculated from the amplitude ratio FE1/FE2 of the amplitude values FE1 and FE2 in FIG. 9(a) in the objective lens displacement processing (step S22) described below; if this calculation could not be carried out, the spherical aberration control section 3 directs the spherical aberration control element 15 and objective lens actuator 18 in the optical pickup 11 to control the spherical aberration (SA) in the second recording layer L2 (step S35). The SA control process in the second recording layer L2 (step S35) is similar to the SA control process in the first recording layer L1 (step S29). The optimal amount of SA control obtained in the SA control process (step S35) in the second recording layer L2 is equivalent to SAo.

Next, the signal processing section 2 turns off the tracking servo (the tracking error signal generator 24b, objective lens actuator 18, etc.) (step S36).

Next, the signal processing section 2 has the spherical aberration control element 15, objective lens 17, and objective lens actuator 18 in the optical pickup 11 execute a fourth interlayer jump process (step S37). The fourth interlayer jump processing routine (step S37) is a step performed by the optical pickup 11, focus error signal generator 24a, central controller 30, and spherical aberration controller 32; the details of the processing method will be described below with reference to the flowchart in FIG. 15.

Next, the signal processing section 2 turns on the tracking servo (the tracking error signal generator 24b, objective lens actuator 18, etc.) (step S38).

Next, the signal processing section 2 decides whether the optimal spherical aberration SAm in the first recording layer L1 has been calculated (step S39). The optimal spherical aberration SAm in the first recording layer L1 is calculated from the amplitude ratio of the amplitude values FE3 and FE4 in FIG. 9(b) in the objective lens displacement processing (step S22) described below; if this calculation could not be carried out, the spherical aberration control section 3 directs the spherical aberration control element 15 and objective lens actuator 18 in the optical pickup 11 to control the spherical aberration (SA) in the first recording layer L1 (step S40). The SA control process in the first recording layer L1 (step S40) is similar to the SA control process in the first recording layer L1 (step S29). The optimal amount of SA control obtained in the SA control process (step S40) in the first recording layer L1 is equivalent to SAm.

Next, the interface device (not shown) sends an instruction to the illumination and light reception section 1 causing the illumination and light reception section 1 to start recording or reproducing data (step S41).

Figure 13:
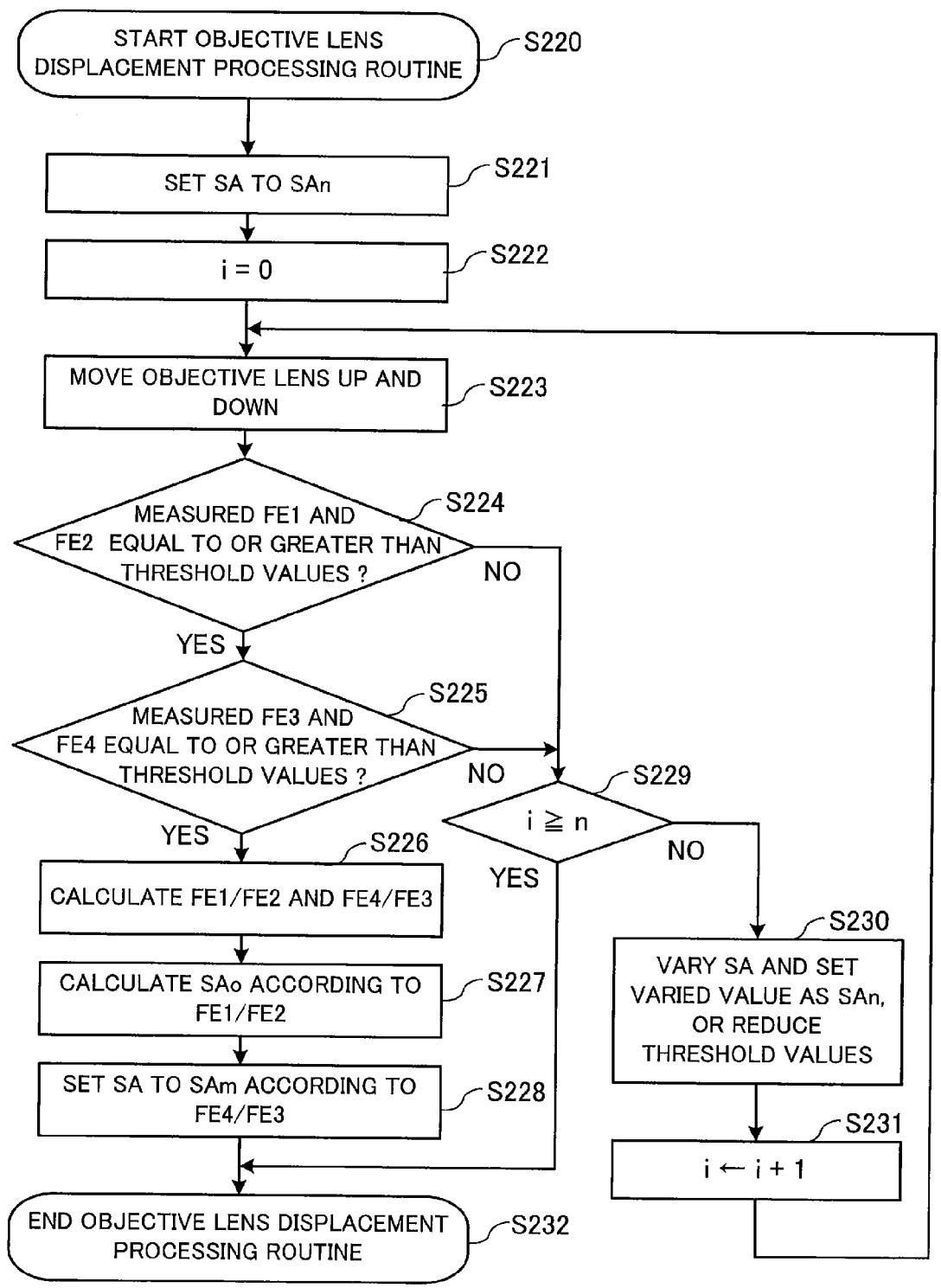
FIG. 13 is a flowchart showing an exemplary objective lens displacement processing routine in the optical recording/reproduction device in the second embodiment.

FIG. 13 is a flowchart showing an exemplary objective lens displacement processing routine in the optical recording/reproduction device 10 in the second embodiment.

FIG. 13 illustrates details of the objective lens displacement processing routine in step S22 in FIG. 12.

As shown in FIG. 13, when the objective lens displacement processing routine starts (step S220), the spherical aberration control section 3 sets the spherical aberration (SA) to SAn (step S221). This SAn may be set freely.

Next, the signal processing section 2 sets i to 0 (step S222). The process for setting i to 0 (step S222) is performed by the central controller 30 etc.

Next, the illumination and light reception section 1 moves the objective lens 17 toward or away from the multilayered optical disc 40 (step S223). The process of moving the objective lens 17 toward or away from the multilayered optical disc 40 (step S223) is performed by the objective lens 17, objective lens actuator 18, focus error signal generator 24a, and central controller 30.

Next, the signal processing section 2 measures the amplitude values FE1 and FE2 in the focus error signal detected when the objective lens 17 is moved away from the multilayered optical disc 40 in the process of moving the objective lens 17 toward or away from the multilayered optical disc 40 (step S223), and decides whether one or both of the measured FE1 and FE2 are equal to or greater than the threshold values shown in FIG. 9(a) (step S224). If the decision in step S224 is Yes, the signal processing section 2 measures the amplitude values FE3 and FE4 in the focus error signal detected when the objective lens 17 is moved toward the multilayered optical disc 40 in the process of moving the objective lens 17 toward or away from the multilayered optical disc 40 (step S223), and decides whether one or both of the measured FE3 and FE4 are equal to or greater than the threshold values shown in FIG. 9(b) (step S225).

If the decision in step S225 is Yes, the values of FE1 and FE2 measured in step S224 and FE3 and FE4 measured in step S225 are all equal to or greater than the threshold values, so the signal processing section 2 proceeds to the process of calculating the amplitude ratios FE1/FE2 and FE4/FE3 (step S226). The step of calculating the amplitude ratios FE1/FE2 and FE4/FE3 (step S226) is performed by the central controller 30.

Next, on the basis of the amplitude ratio FE1/FE2 calculated in step S226, the spherical aberration control section 3 calculates the optimal amount of spherical aberration in the second recording layer L2 (step S227).

Next, on the basis of the amplitude ratio FE4/FE3 calculated in step S226, the spherical aberration control section 3 sets the spherical aberration (SA) to SAm, that is, the optimal amount of spherical aberration in the first recording layer L1 (step S228). The step of setting the spherical aberration to SAm (step S228) is performed by the optical pickup 11, central controller 30, and spherical aberration controller 32.

Next, the objective lens displacement processing routine ends (step S232).

If at least one of the decisions in steps S224 and S225 is No, the signal processing section 2 decides whether i is equal to or greater than n (step S229). If the decision in step S229 is Yes, which indicates that one of the amplitude values FE1, FE2, FE3, FE4 is not equal to or greater than the threshold value despite performance of the process of moving the objective lens 17 toward or away from the multilayered optical disc 40 (step S223) n times, the objective lens displacement processing routine ends in the state in which the optimal amount of spherical aberration SAm in the first recording layer L1 and the optimal amount of spherical aberration SAo in the second recording layer L2 have not been calculated (step S232).

If the decision in step S229 is No, the spherical aberration control section 3 varies the spherical aberration (SA). Simultaneously, the signal processing section 2 sets the varied value as SAn (step S230) or, alternatively, reduces the threshold values in FIGS. 9(a) and 9(b). The process of varying the spherical aberration and setting the varied value as SAn or reducing the threshold values (step S230) is performed by the optical pickup 11, central controller 30, and spherical aberration controller 32.

The reason for varying the spherical aberration (step S230) in the second embodiment is the failure of one of the amplitude values FE1, FE2, FE3, FE4 in the focus error signal (FIGS. 9(a) and 9(b)) detected when the objective lens 17 is moved toward or away from the multilayered optical disc 40 (step S223) to reach the threshold value. That is, the reason is that the value of the spherical aberration SAn set when the interlayer jump was made was closer to the appropriate amount of spherical aberration for the first recording layer L1, or closer to the appropriate amount of spherical aberration for the second recording layer L2. Therefore, if the set value is closer to the appropriate amount of the spherical aberration for the first recording layer L1, the value is varied to approach the appropriate amount of the spherical aberration for the second recording layer L2; if the value is closer to the appropriate amount of the spherical aberration for the second recording layer L2, the value is varied to approach the appropriate amount of the spherical aberration for the first recording layer L1. The size of the variation may be set freely.

In step S230, the threshold values in FIGS. 9(a) and 9(b) may be reduced. This is an effective process when all of the amplitude values FE1, FE2, FE3, FE4 in the focus error signal (FIGS. 9(a) and 9(b)) detected when the objective lens 17 is moved toward or away from the multilayered optical disc 40 (step S223) fail to reach the threshold value. It is necessary to select appropriate threshold values, however, such that when the process of moving the objective lens 17 toward or away from the multilayered optical disc 40 (step S223) is performed, waveform peaks with voltage changes equal to or greater than the threshold values do not appear more than four times when the objective lens 17 is moved in the direction away from the multilayered optical disc 40, and waveform peaks with voltage changes equal to or greater than the threshold values do not appear more than four times when the objective lens 17 is moved in the direction toward the multilayered optical disc 40.

Next, the signal processing section 2 increases the value of i by one (step S231). The process of increasing the value of i by one (step S231) is performed by the central controller 30 etc. After the process in step S231 has been performed, the process of moving the objective lens 17 toward or away from the multilayered optical disc 40 is performed (step S223).

If x denotes the amplitude ratio FE1/FE2 and y denotes the absolute value |SAn−SAo| of the difference between SAn and SAo in the linear function (first-order approximation line) given by the following formula, $$y = a3 \cdot x + b3 \qquad (3)$$

the step of calculating SAo on the basis of the amplitude ratio FE1/FE2 of the amplitude values FE1 and FE2 of the ascending and descending S-shaped waveform peaks (step S227)

means that |SAn−SAo| is approximated, that is, SAo is approximated, from the amplitude ratio FE1/FE2. Optimal spherical aberration control can thereby be carried out in a short time for the second recording layer L2.

Similarly, if x denotes the amplitude ratio FE4/FE3 and y denotes the difference (SAm−SAn) between SAm and SAn in the linear function (first-order approximation line) given by the following formula, $$y = a4 \cdot x + b4 \quad (4)$$

the step of setting the spherical aberration (SA) to SAm on the basis of the amplitude ratio FE4/FE3 of the amplitude values FE3 and FE4 of the ascending and descending S-shaped waveform peaks (step S228) includes a step of approximating (SAm−SAn), that is, approximating SAm, from the amplitude ratio FE4/FE3. Optimal spherical aberration control can thereby be carried out in a short time for the first recording layer L1.

The objective lens displacement processing routine in FIG. 13, which is performed just after the multilayered optical disc 40 is inserted in FIG. 12, may be performed at any time before the focus servo is turned on (step S25).

Figure 14:
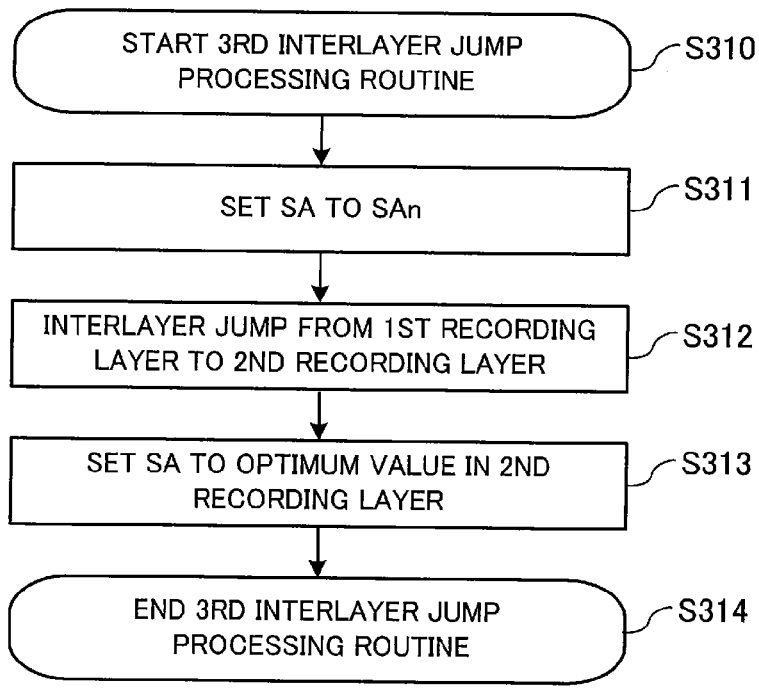
FIG. 14 is a flowchart showing an exemplary third interlayer jump processing routine in the optical recording/reproduction device in the second embodiment.

FIG. 14 is a flowchart showing an exemplary third interlayer jump processing routine in the optical recording/reproduction device 10 in the second embodiment. FIG. 14 illustrates details of the third interlayer jump processing routine in step S31 in FIG. 12.

As shown in FIG. 14, when the third interlayer jump processing routine starts (step S310), the spherical aberration control section 3 sets the spherical aberration (SA) to SAn (step S311). This SAn is preferably a value between the optimal amount of spherical aberration SAm for the first recording layer L1 and the optimal amount of spherical aberration SAo for second recording layer L2 calculated in the objective lens displacement processing routine in step S22 in FIG. 12. This setting enables a stable interlayer jump to be made from the first recording layer L1 to the second recording layer L2.

Next, the illumination and light reception section 1 makes an interlayer jump from the first recording layer L1 to the second recording layer L2 (step S312). The interlayer jump (step S312) is made by the optical pickup 11, focus error signal generator 24a, and central controller 30.

Next, the spherical aberration control section 3 sets the spherical aberration (SA) to the optimal amount of spherical aberration SAo in the second recording layer L2 (step S313). The step of setting the spherical aberration (SA) to SAo (step S313) is performed by the optical pickup 11, central controller 30, and spherical aberration controller 32.

Next, the third interlayer jump processing routine ends (step S314).

The third interlayer jump processing routine in FIG. 14 is the process of making an interlayer jump from the first recording layer L1 to the second recording layer L2. This interlayer jump from the first recording layer L1 to the second recording layer L2 is made for the purpose of performing the gain and offset adjustment in the second recording layer L2 in FIG. 12.

Figure 15:
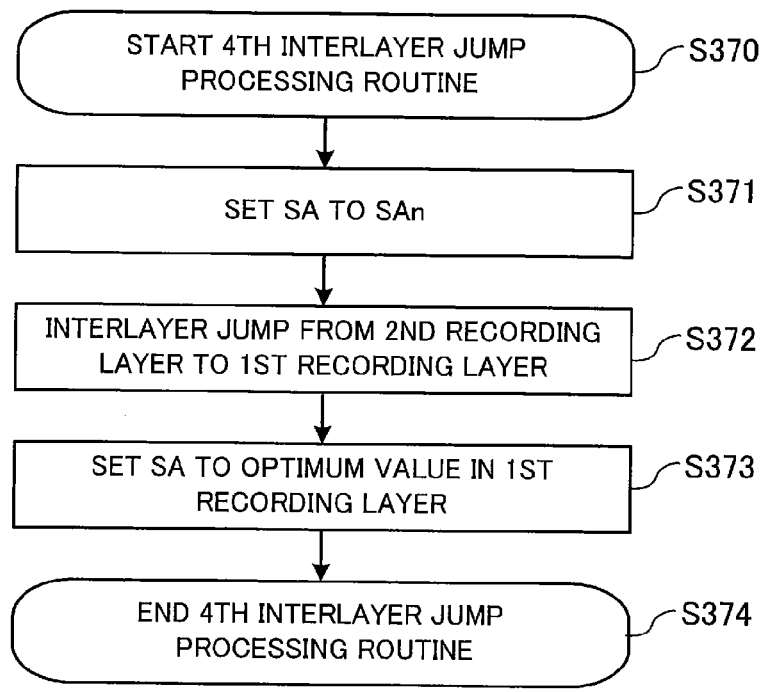
FIG. 15 is a flowchart showing an exemplary fourth interlayer jump processing routine in the optical recording/reproduction device in the second embodiment.

FIG. 15 is a flowchart showing an exemplary fourth interlayer jump processing routine in the optical recording/reproduction device 10 in the second embodiment. FIG. 15 illustrates details of the fourth interlayer jump processing routine in step S37 in FIG. 12.

As shown in FIG. 15, when the fourth interlayer jump processing routine starts (step S370), the spherical aberration control section 3 sets the spherical aberration (SA) to SAn (step S371). This SAn is preferably a value between the optimal amount of spherical aberration SAm for the first recording layer L1 and the optimal amount of spherical aberration SAo for second recording layer L2 calculated in the objective lens displacement processing routine in step S22 in FIG. 12. This setting enables a stable interlayer jump to be made from the second recording layer L2 to the first recording layer L1.

Next, the illumination and light reception section 1 makes an interlayer jump from the second recording layer L2 to the first recording layer L1 (step S372). The interlayer jump (step S372) is made by the optical pickup 11, focus error signal generator 24a, and central controller 30.

Next, the spherical aberration control section 3 sets the spherical aberration (SA) to the optimal amount of spherical aberration SAm in the first recording layer L1 (step S373). The step of setting the spherical aberration (SA) to SAm (step S373) is performed by the optical pickup 11, central controller 30, and spherical aberration controller 32.

Next, the fourth interlayer jump processing routine ends (step S374).

The fourth interlayer jump processing routine in FIG. 15 is a process of making an interlayer jump from the second recording layer L2 to the first recording layer L1. This interlayer jump from the second recording layer L2 to the first recording layer L1 is made for the purpose of starting the process of recording or reproducing data in step S41 in FIG. 12 from the first recording layer L1 after the fourth interlayer jump processing routine. More specifically, it is necessary to move the focal position of the focused spot of laser light directed onto the information recording surface of the multilayered optical disc 40 to the first recording layer L1 before starting to record or reproduce data in step S41.

In a device for recording on and/or reproducing from a multilayered optical disc 40, optimal spherical aberration control can be carried out in a short time for the first recording layer L1 and the second recording layer L2 in a dual-layer BD according to the optical recording/reproduction device 10 and the optical recording/reproduction method in the second embodiment as described above.

Although the amplitude ratio FE1/FE2 of the amplitude values FE1 and FE2 is used in steps S226 and S227 in FIG. 13 in the description above, the amplitude ratio FE2/FE1 may be used. Similarly, although the amplitude ratio FE4/FE3 of the amplitude values FE3 and FE4 is used in steps S226 and S228 in FIG. 13, instead of this amplitude ratio FE4/FE3, the amplitude ratio FE3/FE4 may be used.

Third Embodiment

In the first and second embodiments, methods of calculating the optimal amount of spherical aberration in a multilayered optical disc 40 of the dual-layer BD type were described. In the third embodiment, a method of calculating the optimal amount of spherical aberration in a multilayered BD with k recording layers (k≧3) will be described.

The optical recording/reproduction device in the third embodiment is similar in structure to the optical recording/reproduction devices in the first and second embodiments, illustrated in FIG. 1. FIG. 1 will therefore also be referred to in the description of the third embodiment.

Figure 16:
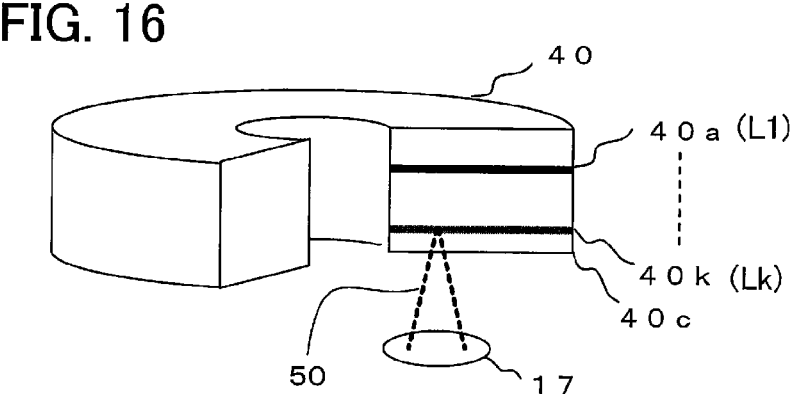
FIG. 16 is a partially cutaway perspective view schematically showing an exemplary structure of a multilayered BD having k recording layers ($k \geq 3$).

FIG. 16 is a partially cutaway perspective view schematically showing an exemplary structure of a multilayered BD having k recording layers (k being an integer equal to or greater than three), as the multilayered optical disc 40 shown in FIG. 1. FIG. 16 shows the surfaces 40c of the first recording layer 40a (L1) and the k-th recording layer 40k (Lk). As seen from the objective lens 17, the most distant recording layer is the first recording layer and the closest recording layer is the k-th recording layer. FIG. 16 shows the light bundle 50 focused on the k-th recording layer 40k after passing through the objective lens 17.

Figure 17A:
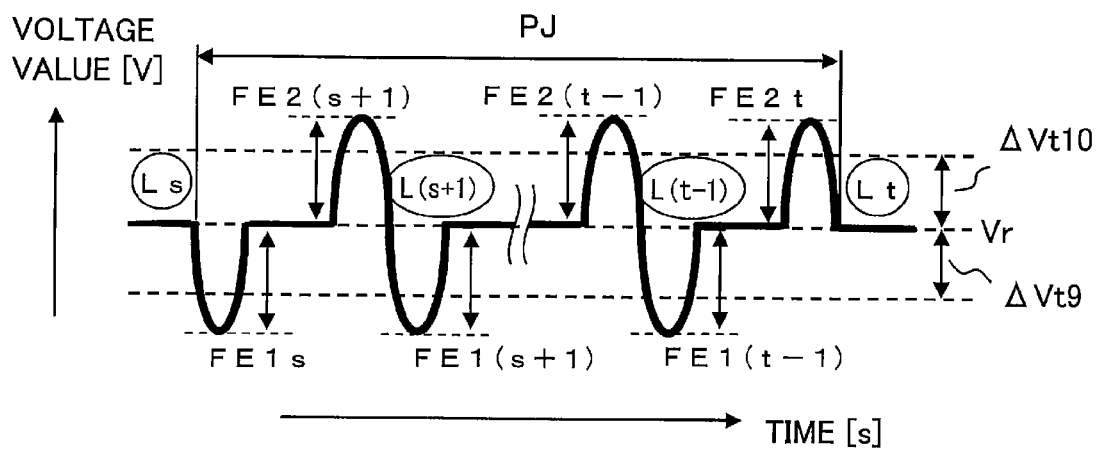
FIG. 17(a) shows an exemplary waveform of the focus error signal detected when an interlayer jump is made from the s-th recording layer to the t-th recording layer ($1 \leq s < t \leq k$) in a multilayered BD having k recording layers ($k \geq 3$)
Figure 17B:
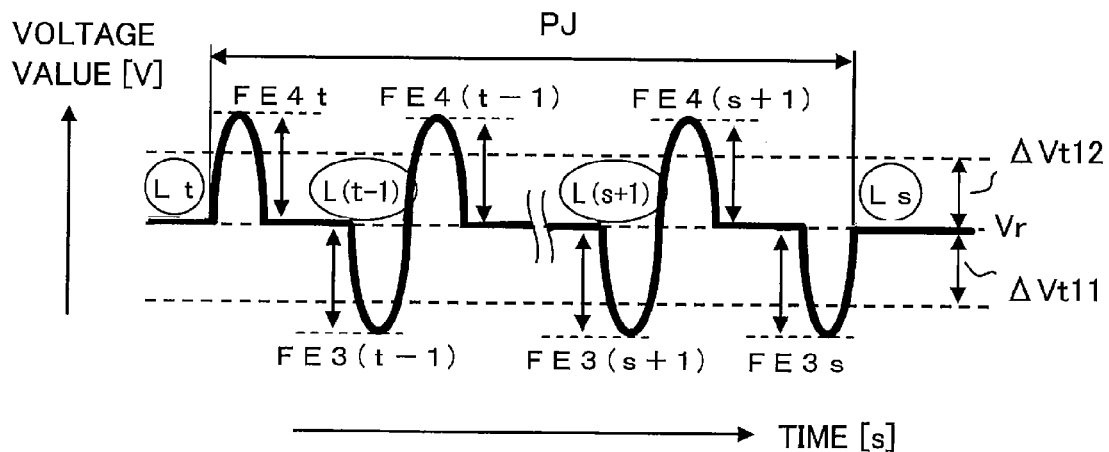
FIG. 17(b) shows an exemplary waveform of the focus error signal detected when an interlayer jump is made from the t-th recording layer to the s-th recording layer in a multilayered BD having k recording layers.

FIG. 17(a) shows an exemplary waveform of the focus error signal detected when an interlayer jump is made from the s-th recording layer Ls to the t-th recording layer Lt ($1 \leq s < t \leq k$) in a multilayered BD having k recording layers ($k \geq 3$); FIG. 17(b) shows an exemplary waveform of the focus error signal detected when an interlayer jump is made from the t-th recording layer Lt to the s-th recording layer Ls ($1 \leq s < t \leq k$).

When an interlayer jump is made from the s-th recording layer Ls to the t-th recording layer Lt, or when an interlayer jump is made from the t-th recording layer Lt to the s-th recording layer Ls, if the interlayer jump crosses a plurality of recording layers (if there are other recording layers between the t-th recording layer Lt and the s-th recording layer Ls), an S-shaped waveform appears when the objective lens 17 passes through the focal position of each of these recording layers, as shown in FIGS. 17(a) and 17(b). If the s-th recording layer Ls adjoins the t-th recording layer Lt, that is, if s+1=t, the waveform of the focus error signal detected when the interlayer jump is made has the same shape as the waveform of the focus error signal (FIGS. 3(a) and 3(b)) detected when an interlayer jump is made from the first recording layer L1 to the second recording layer L2 or when an interlayer jump is made from the second recording layer L2 to the first recording layer L1 in a dual-layer BD: only a descending S-shaped waveform peak and an ascending S-shaped waveform peak appear.

When the objective lens 17 leaves the focal position of the s-th recording layer Ls in FIG. 17(a), a descending S-shaped waveform peak appears. The amplitude value of this ascending S-shaped waveform peak will be denoted FE1s. Just before the objective lens 17 arrives at the focal position of the (s+1)-th recording layer L(s+1), an ascending S-shaped waveform peak appears; when the objective lens 17 leaves the focal position of the (s+1)-th recording layer L(s+1), the descending S-shaped waveform peak appears. The amplitude value of this ascending S-shaped waveform peak will be denoted FE2(s+1); the amplitude value of the descending S-shaped waveform peak will be denoted FE1(s+1). Just before the objective lens 17 arrives at the focal position of the (t−1)-th recording layer L(t−1), another ascending S-shaped waveform peak appears; when the objective lens 17 leaves the focal position of the (t−1)-th recording layer L(t−1), the descending S-shaped waveform peak appears. The amplitude value of this ascending S-shaped waveform peak will be denoted FE2(t−1); the amplitude value of the descending S-shaped waveform peak will be denoted FE1(t−1). Just before the objective lens 17 arrives at the focal position of the t-th recording layer Lt, still another ascending S-shaped waveform peak appears. The amplitude value of this ascending S-shaped waveform peak will be denoted FE2t.

When the objective lens 17 leaves the focal position of the t-th recording layer Lt in FIG. 17(b), an ascending S-shaped waveform peak appears. The amplitude value of this ascending S-shaped waveform peak will be denoted FE4t. Just before the objective lens 17 arrives at the focal position of the (t−1)-th recording layer L(t−1), a descending S-shaped waveform peak appears; when the objective lens 17 leaves the focal position of the (t−1)-th recording layer L(t−1), the ascending S-shaped waveform peak appears. The amplitude value of this descending S-shaped waveform peak will be denoted FE3(t−1); the amplitude value of the ascending S-shaped waveform peak will be denoted FE4(t−1). Just before the objective lens 17 arrives at the focal position of the (s+1)-th recording layer L(s+1), another descending S-shaped waveform peak appears; when the objective lens 17 leaves the focal position of the (s+1)-th recording layer L(s+1), the ascending S-shaped waveform peak appears. The amplitude value of this descending S-shaped waveform peak will be denoted FE3(s+1); the amplitude value of the ascending S-shaped waveform peak will be denoted FE4(s+1). Just before the objective lens 17 arrives at the focal position of the s-th recording layer Ls, still another descending S-shaped waveform peak appears. The amplitude value of this descending S-shaped waveform peak will be denoted FE3s.

In the waveform shown in FIG. 17(a), the change in voltage from the reference voltage Vr obtained when no interlayer jump is made is measured at certain sampling intervals and compared with the threshold value $\Delta Vt9$ or $\Delta Vt10$; the amplitude values FE1s, FE2(s+1), FE1(s+1), . . . , FE2(t−1), FE1(t−1), and FE2t are amplitudes of the waveform measured when the voltage change is equal to or greater than the threshold value. More specifically, during the time period PJ from the start to the end of the interlayer jump, FE1s is the amplitude value the first time the change in voltage from the reference value becomes equal to or greater than the threshold value, FE2(s+1) is the amplitude value the second time the change becomes equal to or greater than the threshold value, and FE1(s+1) is the amplitude value the third time the change becomes equal to or greater than the threshold value. Similarly, FE2(t−1) is the amplitude value the [2·(t−s−1)]-th time the change becomes equal to or greater than the threshold value, FE1(t−1) is the amplitude value the [2·(t−s)−1]-th time the change becomes equal to or greater than the threshold value, and FE2t is the amplitude value the [2·(t−s)]-th time the change becomes equal to or greater than the threshold value. Although the threshold values may be set freely in the third embodiment, it is necessary to select appropriate threshold values such that waveform peaks with voltage changes equal to or greater than a threshold value do not appear more than [2·(t−s)] times (or [2·|t−s|] times).

Similarly, in the waveform shown in FIG. 17(b), the change in voltage from the reference voltage Vr obtained when no interlayer jump is made is measured at certain sampling intervals and compared with the threshold value $\Delta Vt11$ or $\Delta Vt12$; the amplitude values FE3s, FE4(s+1), FE3(s+1), FE4(t−1), FE3(t−1), and FE4t are amplitudes of the waveform measured when the voltage change is equal to or greater than the threshold value. More specifically, during the time period PJ from the start to the end of the interlayer jump, FE4t is the amplitude value the first time the change in voltage from the reference value becomes equal to or greater than the threshold value, FE3(t−1) is the amplitude value the second time the change becomes equal to or greater than the threshold value, and FE4(t−1) is the amplitude value the third time the change becomes equal to or greater than the threshold value. Similarly, FE3(s+1) is the amplitude value the [2·(t−s−1)]-th time the change becomes equal to or greater than the threshold value, FE4(s+1) is the amplitude value the [2·(t−s)−1]-th time the change becomes equal to or greater than the threshold value, and FE3s is the amplitude value the [2·(t−s)]-th time the change becomes equal to or greater than the threshold value. Although the threshold values may be set freely in the third embodiment, it is necessary to select appropriate threshold values such that waveform peaks with voltage changes equal to or greater than a threshold value do not appear more than [2·(t−s)] times (or [2·|t−s|] times).

The waveform of the focus error signal detected when an interlayer jump is made from the s-th recording layer Ls to the t-th recording layer Lt and the waveform of the focus error signal detected when an interlayer jump is made from the t-th recording layer Lt to the s-th recording layer Ls are not restricted to waveforms like the ones shown in FIGS. 17(a) and 17(b).

In the waveform (FIG. 17(a)) of the focus error signal detected when an interlayer jump is made from an s-th recording layer to a t-th recording layer satisfying s≦p<q≦t in a multilayered BD having k recording layers (k≧3) (FIG. 16) with the spherical aberration set to SAn, if the amplitude ratio FE1p/FE2q of the ascending and descending S-shaped waveform peaks shown in FIG. 17(a) is denoted x, (SAn−SAq) is denoted y, and aq and bq are constants, the relation between x and y can be approximately represented as a linear function (first-order approximation line) by the following formula.

$$y = aq \cdot x + bq \quad (5)$$

FE1p is the amplitude value of the waveform that appears just after the objective lens 17 passes through the focal position of the p-th recording layer, FE2q is the amplitude value of the waveform that appears just before the objective lens 17 passes through the focal position of the q-th recording layer, and SAq is the optimal amount of spherical aberration in the q-th recording layer.

Similarly, in the waveform (FIG. 17(b)) of the focus error signal detected when an interlayer jump is made from a t-th recording layer to an s-th recording layer satisfying s≦p<q≦t with the spherical aberration set to SAn, if the amplitude ratio FE4q/FE3p of the ascending and descending S-shaped waveform peaks shown in FIG. 17(b) is denoted x, (SAp−SAn) is denoted y, and ap and bp are constants, the relation between x and y can be approximately represented as a linear function (first-order approximation line) by the following formula.

$$y = ap \cdot x + bp \quad (6)$$

FE3p is the amplitude value of the waveform that appears just before the objective lens 17 passes through the focal position of the p-th recording layer, FE4q is the amplitude value of the waveform that appears just after the objective lens 17 passes through the focal position of the q-th recording layer, and SAp is the optimal amount of spherical aberration in the p-th recording layer.

The constants aq and bq in formula (5) and the constants ap and by in formula (6) are predetermined. These constants aq, bq, ap, by differ according to the type of multilayered optical disc 40, however, that is, they differ depending on whether the multilayered optical disc 40 is of the reproduce-only, write-once, or rewritable type. The values of the constants aq, bq, ap, by must therefore be determined according to the type of multilayered optical disc 40.

The relation between the amplitude ratio of the ascending and descending S-shaped waveform peaks and the difference (SAn−SAq) is not restricted to a first-order approximation such as the one expressed by formula (5); similarly, the relation between the amplitude ratio of the ascending and descending S-shaped waveform peaks and (SAn−SAp) is not restricted to a first-order approximation such as the one expressed by formula (6). The first-order approximation formulas (5) and (6) will be used, however, in describing the operation (optical recording/reproduction method) of the optical recording/reproduction device 10 below.

The operation (optical recording/reproduction method) of the optical recording/reproduction device 10 in the third embodiment is generally similar to the operation (optical recording/reproduction method) of the optical recording/reproduction device 10 in the first embodiment shown in FIGS. 6 to 8. It is necessary to perform gain and offset adjustments and control the spherical aberration for all k recording layers (k≧3), however, in the way that gain and offset adjustments were performed (steps S6 and S12) and the spherical aberration was controlled (steps S16 or S19 and S10 or S14) for the first recording layer L1 and second recording layer L2 in FIG. 6. The process of calculating the optimal amount of spherical aberration SAq in the q-th recording layer, on the basis of the focus error signal detected when an interlayer jump is made from an s-th recording layer to a t-th recording layer satisfying 1≦s<t≦k and s≦p<q≦t, is substantially similar to the process illustrated in FIG. 7. The process of calculating the optimal amount of spherical aberration SAp in the p-th recording layer, on the basis of the focus error signal detected when an interlayer jump is made from the t-th recording layer to the s-th recording layer, is substantially similar to the process illustrated in FIG. 8.

In a device for recording on and/or reproducing from a multilayered optical disc 40, optimal spherical aberration control can be carried out in a short time for all recording layers in a multilayered BD with k recording layers (k≧3) according to the optical recording/reproduction device and the optical recording/reproduction method in the third embodiment as described above.

Although the amplitude ratio FE1p/FE2q of the amplitude values of the focus error signal detected when an interlayer jump is made from the s-th recording layer to the t-th recording layer is used in the description above, instead of this amplitude ratio FE1p/FE2q, the amplitude ratio FE2q/FE1p may be used. Similarly, although the amplitude ratio FE4q/FE3p of the amplitude values of the focus error signal detected when an interlayer jump is made from the t-th recording layer to the s-th recording layer is used, instead of this amplitude ratio FE4q/FE3p, the amplitude ratio FE3p/FE4q may be used.

Although an interlayer jump from the t-th recording layer Lt to the s-th recording layer Ls was described as an interlayer jump from a t-th recording layer to an s-th recording layer, the interlayer jump from the t-th recording layer Lt to the s-th recording layer Ls described above can also be described in a general way as an interlayer jump from the s-th recording layer to the t-th recording layer. In the focus error signals detected during an interlayer jump made from the s-th recording layer Ls to the t-th recording layer Lt and from the t-th recording layer Lt to the s-th recording layer Ls, the optimal amount of spherical aberration for any recording layer passed through in the interlayer jump can be therefore calculated on the basis of the ratio of the amplitude values of any two waveforms equal to or greater than the threshold values in FIGS. 17(a) and 17(b).

Fourth Embodiment

In the third embodiment, a method of calculating the optimal amount of spherical aberration at the destination of an interlayer jump from an s-th recording layer to a t-th recording layer satisfying 1≦s<t≦k in a BD having k recording layers (k≧3) on the basis of the ratio of two amplitude values of the focus error signal detected during the interlayer jump was described. As in the second embodiment, the optimal amount of spherical aberration can be calculated by displacing the objective lens 17 in the focusing direction not only in an interlayer jump but also during discrimination of the multilayered optical disc, when the focus servo is turned on, and at other times.

The structure of the optical recording/reproduction device in the fourth embodiment is similar to the structure of the optical recording/reproduction device in the first embodiment, shown in FIG. 1. FIG. 1 will therefore also be referred to in the description of the fourth embodiment. The multilayered optical disc in the fourth embodiment is similar to the multilayered optical disc shown in FIG. 16 in the third embodiment. FIG. 16 will therefore also be referred to in the description of the fourth embodiment.

Figure 18A:
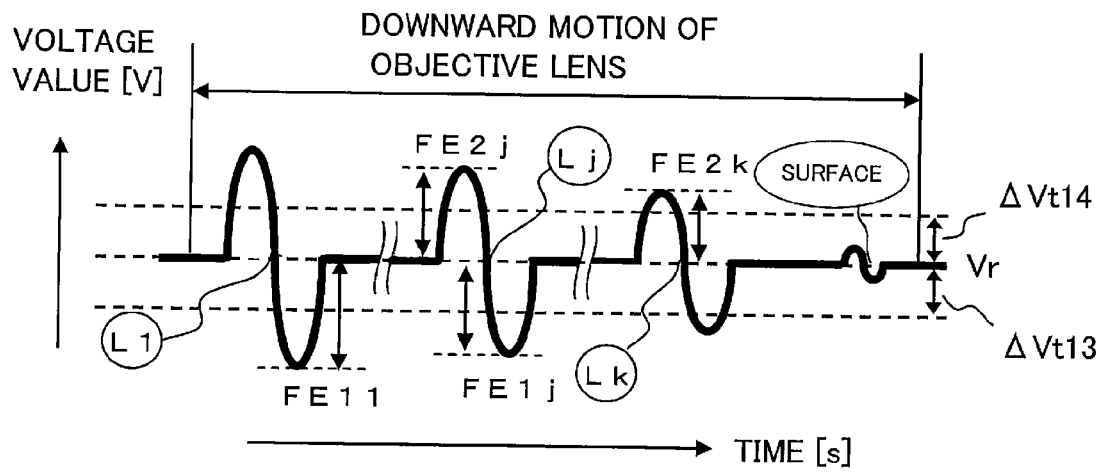
FIG. 18(a) shows an exemplary waveform of the focus error signal detected when the objective lens is moved in the direction away from the multilayered optical disc in a multilayered BD having k recording layers ($k \geq 3$)
Figure 18B:
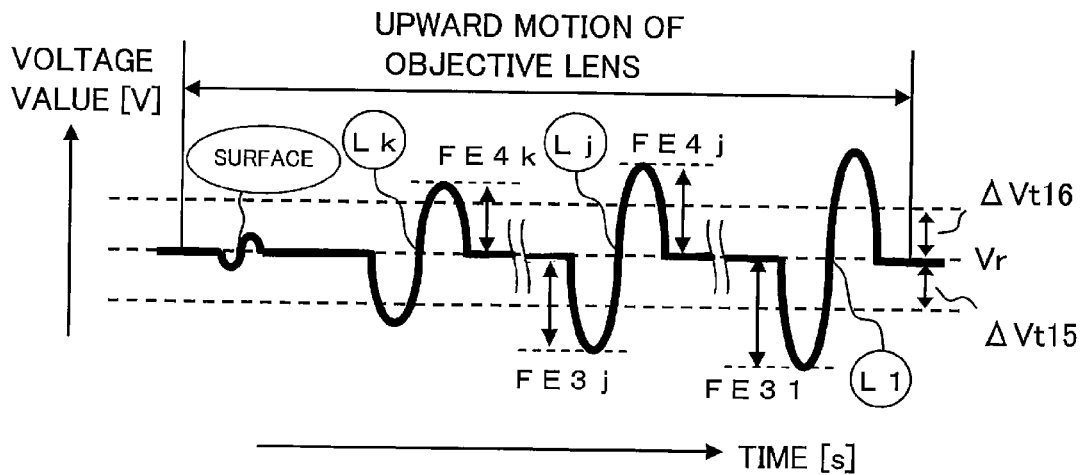
FIG. 18(b) shows an exemplary waveform of the focus error signal detected when the objective lens is moved in the direction toward the multilayered optical disc in a multilayered BD having k recording layers.

FIG. 18(a) shows an exemplary focus error signal detected when the objective lens is moved perpendicularly to the surface of the multilayered optical disc 40 in the direction away from the multilayered optical disc 40, passing through the focal positions of all the recording layers of the multilayered optical disc 40, after a multilayered optical disc (e.g., a multilayered BD) having k recording layers (k≧3) has been inserted into the optical recording/reproduction device in the fourth embodiment; FIG. 18(b) shows an exemplary focus error signal detected when the objective lens is moved perpendicularly to the surface of the multilayered optical disc 40 in the direction toward the multilayered optical disc 40. Incidentally, j is an integer satisfying 1≦j≦k.

When the objective lens 17 is moved in the direction away from the multilayered optical disc 40, just before the objective lens 17 passes through the focal position of the first recording layer L1, an ascending S-shaped waveform peak appears in FIG. 18(a), and just after the objective lens 17 passes through the focal position of the first recording layer L1, the descending S-shaped waveform peak appears. Just before the objective lens 17 passes through the focal position of the j-th recording layer Lj, another ascending S-shaped waveform peak appears, and just after the objective lens 17 passes through the focal position of the j-th recording layer Lj, the descending S-shaped waveform peak appears. Just before the objective lens 17 passes through the focal position of the k-th recording layer Lk, still another ascending S-shaped waveform peak appears, and just after the objective lens 17 passes through the focal position of the k-th recording layer Lk, the descending S-shaped waveform peak appears. Just before the objective lens 17 passes through the surface, still another ascending S-shaped waveform peak appears, and just after the objective lens 17 passes through the surface, the descending S-shaped waveform peak appears. The amplitude value of the descending S-shaped waveform peak that appears just after the objective lens 17 passes through the focal position of the first recording layer L1 will be denoted FE1$l$; similarly, the amplitude value of the ascending S-shaped waveform peak that appears just before the objective lens 17 passes through the focal position of the j-th recording layer Lj will be denoted FE2$j$; the amplitude value of the descending S-shaped waveform peak that appears just after the objective lens 17 passes through the focal position of the j-th recording layer Lj will be denoted FE1$j$; the amplitude value of the ascending S-shaped waveform peak that appears just before the objective lens 17 passes through the focal position of the k-th recording layer Lk will be denoted FE2$k$.

When the objective lens 17 is moved in the direction toward the multilayered optical disc 40, just before the objective lens 17 passes through the surface, a descending S-shaped waveform peak appears in FIG. 18(b), and just after the objective lens 17 passes through the surface, the ascending S-shaped waveform peak appears. Just before the objective lens 17 passes through the focal position of the k-th recording layer Lk, another descending S-shaped waveform peak appears, and just after the objective lens 17 passes through the focal position of the k-th recording layer Lk, the ascending S-shaped waveform peak appears. Just before the objective lens 17 passes through the focal position of the j-th recording layer Lj, still another descending S-shaped waveform peak appears, and just after the objective lens 17 passes through the focal position of the j-th recording layer Lj, the ascending S-shaped waveform peak appears. Just before the objective lens 17 passes through the focal position of the first recording layer L1, still another descending S-shaped waveform peak appears, and just after the objective lens 17 passes through the focal position of the first recording layer L1, the ascending S-shaped waveform peak appears. The amplitude value of the ascending S-shaped waveform peak that appears just after the objective lens 17 passes through the focal position of the k-th recording layer Lk will be denoted FE4$k$; similarly, the amplitude value of the descending S-shaped waveform peak that appears just before the objective lens 17 passes through the focal position of the j-th recording layer Lj will be denoted FE3$j$; the amplitude value of the ascending S-shaped waveform peak that appears just after the objective lens 17 passes through the focal position of the j-th recording layer Lj will be denoted FE4$j$; the amplitude value of the ascending S-shaped waveform peak that appears just before the objective lens 17 passes through the focal position of the first recording layer L1 will be denoted FE31.

In the waveform shown in FIG. 18(a), the change in voltage from the reference voltage Vr obtained when the objective lens 17 is not moved in the direction away from the multilayered optical disc 40 is measured at certain sampling intervals and compared with the threshold value ΔVt13 or ΔVt14, and the amplitude values FE11, ..., FE2$j$, FE1$j$, ..., FE2$k$ are amplitudes of the waveform measured when the voltage change is equal to or greater than the threshold value. More specifically, when the objective lens 17 is moved in the direction away from the multilayered optical disc 40, FE11 is the amplitude value the second time the change in voltage from the reference value becomes equal to or greater than the threshold value. Similarly, FE2$j$ is the amplitude value the (2·j−1)-th time the change becomes equal to or greater than the threshold value; FE1$j$ is the amplitude value the (2·j)-th time the change becomes equal to or greater than the threshold value; FE2$k$ is the amplitude value the (2·k−1)-th time the change becomes equal to or greater than the threshold value. Although the threshold values may be set freely in the fourth embodiment, it is necessary to select appropriate threshold values such that waveform peaks with voltage changes equal to or greater than a threshold value do not appear more than (2·k) times.

Similarly, in the waveform shown in FIG. 18(b), the change in voltage from the reference voltage Vr obtained when the objective lens 17 is not moved in the direction toward the multilayered optical disc 40 is measured at certain sampling intervals and compared with the threshold value ΔVt15 or ΔVt16, and the amplitude values FE31, ..., FE4$j$, FE3$j$, ..., FE4$k$ are amplitudes of the waveform measured when the voltage change is equal to or greater than the threshold value. More specifically, when the objective lens 17 is moved in the direction toward the multilayered optical disc 40, FE4$k$ is the amplitude value the second time the change in voltage from the reference value becomes equal to or greater than the threshold value. Similarly, FE3$j$ is the amplitude value the [2·(k−j+1)−1]-th time the change becomes equal to or greater than the threshold value; FE4$j$ is the amplitude value the [2·(k−j+1)]-th time the change becomes equal to or greater than the threshold value; FE31 is the amplitude value the (2·k−1)-th time the change becomes equal to or greater than the threshold value. Although the threshold values may be set freely in the fourth embodiment, it is necessary to select appropriate threshold values such that waveform peaks with voltage changes equal to or greater than a threshold value do not appear more than (2·k) times.

The waveform of the focus error signal detected when the objective lens 17 is moved in the direction away from the multilayered optical disc 40 and the waveform of the focus error signal detected when the objective lens 17 is moved in the direction toward the multilayered optical disc 40 are not restricted to waveforms like the ones shown in FIGS. 18(a) and 18(b).

In the waveform (FIG. 18(a)) of the focus error signal detected when the objective lens 17 is moved in the direction away from the multilayered optical disc 40 in the multilayered optical disc 40 having k recording layers (k≧3) (FIG. 16) with the spherical aberration set to SAn, for arbitrary v and w satisfying s≦v<w≦t, if the amplitude ratio FE1v/FE2w of the ascending and descending S-shaped waveform peaks shown in FIG. 18(a) is denoted x, (SAn−SAw) is denoted y, and aw and bw are constants, the relation between x and y can be approximately represented as a linear function (first-order approximation line) by the following formula.

$$y = aw \cdot x + bw \quad (7)$$

FE1v is the amplitude value of the waveform that appears just after the objective lens 17 passes through the focal position of the v-th recording layer, FE2w is the amplitude value of the waveform that appears just before the objective lens 17 passes through the focal position of the w-th recording layer, and SAw is the optimal amount of spherical aberration in the w-th recording layer.

Similarly, in the waveform (FIG. 18(b)) of the focus error signal detected when the objective lens 17 is moved toward the multilayered optical disc 40 with the spherical aberration set to SAn, for arbitrary v and w satisfying s≦v<w≦t, if the amplitude ratio FE4w/FE3v of the ascending and descending S-shaped waveform peaks shown in FIG. 18(b) is denoted x, (SAv−SAn) is denoted y, and av and bv are constants, the relation between x and y can be approximately represented as a linear function (first-order approximation line) by the following formula.

$$y = av \cdot x + bv \quad (8)$$

FE3v is the amplitude value of the waveform that appears just before the objective lens 17 passes through the focal position of the v-th recording layer, FE4w is the amplitude value of the waveform that appears just after the objective lens 17 passes through the focal position of the w-th recording layer, and SAv is the optimal amount of spherical aberration in the v-th recording layer.

The constants aw and bw in formula (7) and the constants av and bv in formula (8) are predetermined. These constants aw, bw, av, by differ according to the type of multilayered optical disc 40, however, that is, they differ depending on whether the multilayered optical disc 40 is of the reproduce-only, write-once, or rewritable type. The values of the constants aw, bw, av, by must therefore be determined according to the type of multilayered optical disc 40.

The relation between the amplitude ratio of the ascending and descending S-shaped waveform peaks and the difference (SAn−SAw) is not restricted to a first-order approximation such as the one expressed by formula (7); similarly, the relation between the amplitude ratio of the ascending and descending S-shaped waveform peaks and (SAv−SAn) is not restricted to a first-order approximation such as the one expressed by formula (8). The first-order approximation formulas (7) and (8) will be used, however, in describing the operation (optical recording/reproduction method) of the optical recording/reproduction device 10 below.

The operation (optical recording/reproduction method) of the optical recording/reproduction device 10 in the fourth embodiment is generally similar to the operation (optical recording/reproduction method) of the optical recording/reproduction device 10 in the second embodiment shown in FIGS. 12 to 15. It is necessary to perform gain and offset adjustments and control the spherical aberration for all k recording layers (k≧3), however, in the way that gain and offset adjustments were performed (steps S27 and S33) and the spherical aberration was controlled (steps S22 or S40 and S22 or S35) for the first recording layer L1 and second recording layer L2 in FIG. 12. For arbitrary v and w satisfying s≦v<w≦t, the process of calculating the optimal amount of spherical aberration SAv in the v-th recording layer and the optimal amount of spherical aberration SAw in the w-th recording layer on the basis of the focus error signal detected when the objective lens 17 is moved toward or away from the multilayered optical disc 40 is substantially similar to the process illustrated in FIG. 13.

In a device for recording on and/or reproducing from a multilayered optical disc 40, optimal spherical aberration control can be carried out in a short time for all recording layers in a multilayered optical disc with k recording layers (k≧3) according to the optical recording/reproduction device and the optical recording/reproduction method in the fourth embodiment as described above.

Although the amplitude ratio FE1v/FE2w of the amplitude values of the focus error signal detected when the objective lens 17 is moved in the direction away from the multilayered optical disc 40 is used in the description above, instead of this amplitude ratio FE1v/FE2w, the amplitude ratio FE2w/FE1v may be used. Similarly, although the amplitude ratio FE4w/FE3v of the amplitude values of the focus error signal detected when the objective lens 17 is moved in the direction toward the multilayered optical disc 40 is used, instead of this amplitude ratio FE4w/FE3v, the amplitude ratio FE3v/FE4w may be used.

EXPLANATION OF REFERENCE CHARACTERS 1 illumination and light reception section; 2 signal processing section; 3 spherical aberration control section; 10 optical recording/reproduction device; 11 optical pickup; 12 semiconductor laser; 13 collimating lens; 14 splitter; 15 spherical aberration control element; 15a spherical aberration control device; 16 total reflection mirror; 17 objective lens; 18 objective lens actuator; 19 detection lens; 20 light receiving element; 21 head amplifier; 22 laser driver; 23 reproduced signal generator; 24 servo signal generator; 24a focus error signal generator; 24b tracking error signal generator; 25 reproduced signal amplitude detector; 26 equalizer; 27 reproduction jitter detector; 28 focus error signal amplitude detector; 29 tracking error signal amplitude detector; 30 central controller; 31 memory unit; 32 spherical aberration controller; 40 multilayered optical disc.

What is claimed is:
1. An optical recording/reproduction method comprising:
an illumination and light reception step for directing laser light through an objective lens while displacing the objective lens in the focusing direction to illuminate one of the recording layers of a multilayered optical disc having k recording layers (k being an integer equal to or greater than two) with a focused spot and receiving light reflected from the multilayered optical disc with a light receiving element;
a signal processing step for generating a spherical aberration control signal for the focused spot from a received light signal output from the light receiving element on a basis of the received light; and
a spherical aberration control step for controlling the spherical aberration according to the spherical aberration control signal; wherein
the signal processing step includes
a step of obtaining amplitude information about a focus error signal detected during the step of displacing the objective lens in the focusing direction;

a step of calculating, from a ratio of an amplitude value of the focus error signal detected just after leaving a focal position of an arbitrary s-th recording layer of the multilayered optical disc (s being an integer satisfying ($1 \leq s \leq k$)) and an amplitude value of the focus error signal detected just before passing through a focal position of an arbitrary t-th recording layer of the multilayered optical disc (t being an integer satisfying ($1 \leq t \leq k$, $t \neq s$)), an optimal amount of spherical aberration for the t-th recording layer; and a step of generating the spherical aberration control signal on a basis of the calculated optimal amount of spherical aberration.

2. The optical recording/reproduction method of claim 1, wherein the optimal amount of spherical aberration for the t-th recording layer is calculated in the signal processing step from a formula relating the amplitude ratio to (SAn−SAt), SAn being the amount of spherical aberration when the objective lens is displaced in the focusing direction, SAt being the optimal amount of spherical aberration for the t-th recording layer.

3. The optical recording/reproduction method of claim 2, wherein the step of displacing the objective lens in the focusing direction includes:
a step of moving the objective lens from the focal position of the s-th recording layer to the focal position of the t-th recording layer; and
a step of moving the objective lens toward or away from the multilayered optical disc, passing through the focal positions of the k recording layers of the multilayered optical disc.

4. The optical recording/reproduction method of claim 3, wherein:
the amplitude information of the detected focus error signal is the amplitude values when the amplitude values of the focus error signal exceed predetermined threshold values;
the threshold values are set such that when the objective lens is moved from the focal position of the s-th recording layer to the focal position of the t-th recording layer, the amplitude value of the focus error signal exceeds the threshold values ($2 \cdot |t-s|$) times; and
the threshold values are set such that when the objective lens is moved toward or away from the multilayered optical disc, passing through the focal positions of the k recording layers of the multilayered optical disc, the amplitude values of the focus error signal exceed the threshold values ($2 \cdot k$) times when the objective lens is moved away from the multilayered optical disc and ($2 \cdot k$) times when the objective lens is moved toward the multilayered optical disc.

5. The optical recording/reproduction method of claim 4, wherein the multilayered optical disc is of a reproduce-only type, a write-once type, or a rewritable type, and the formula is predetermined for each of the reproduce-only type, the write-once type, and the rewritable type.

6. An optical recording/reproduction device comprising:
an illumination and light reception section for directing laser light through an objective lens while displacing the objective lens in the focusing direction to illuminate one of the recording layers of a multilayered optical disc having k recording layers (k being an integer equal to or greater than two) with a focused spot and receiving light reflected from the multilayered optical disc with a light receiving element;

a signal processing section for generating a spherical aberration control signal for the focused spot from a received light signal output from the light receiving element on a basis of the received light; and
a spherical aberration control section for controlling the spherical aberration according to the spherical aberration control signal; wherein
the signal processing section
obtains amplitude information about a focus error signal detected when the objective lens is displaced in the focusing direction;
calculates, from a ratio of an amplitude value of the focus error signal detected just after leaving a focal position of an arbitrary s-th recording layer of the multilayered optical disc (s being an integer satisfying ($1 \leq s \leq k$)) and an amplitude value of the focus error signal detected just before passing through a focal position of an arbitrary t-th recording layer of the multilayered optical disc (t being an integer satisfying ($1 \leq t \leq k$, $t \neq s$)), an optimal amount of spherical aberration for the t-th recording layer; and
generates the spherical aberration control signal on a basis of the calculated optimal amount of spherical aberration.

7. The optical recording/reproduction device of claim 6, wherein the signal processing section calculates the optimal amount of spherical aberration for the t-th recording layer from a formula relating the amplitude ratio to (SAn−SAt), SAn being the amount of spherical aberration when the objective lens is displaced in the focusing direction, SAt being the optimal amount of spherical aberration for the t-th recording layer.

8. The optical recording/reproduction device of claim 7, wherein displacing the objective lens in the focusing direction includes:
moving the objective lens from the focal position of the s-th recording layer to the focal position of the t-th recording layer; and
moving the objective lens toward or away from the multilayered optical disc, passing through the focal positions of the k recording layers of the multilayered optical disc.

9. The optical recording/reproduction device of claim 8, wherein:
the amplitude information of the detected focus error signal is the amplitude values when the amplitude values of the focus error signal exceed predetermined threshold values;
the threshold values are set such that when the objective lens is moved from the focal position of the s-th recording layer to the focal position of the t-th recording layer, the amplitude values of the focus error signal exceed the threshold values ($2 \cdot |t-s|$) times; and
the threshold values are set such that when the objective lens is moved toward or away from the multilayered optical disc, passing through the focal positions of the k recording layers of the multilayered optical disc, the amplitude values of the focus error signal exceed the threshold values ($2 \cdot k$) times when the objective lens is moved away from the multilayered optical disc and ($2 \cdot k$) times when the objective lens is moved toward the multilayered optical disc.

10. The optical recording/reproduction device of claim 9, wherein the multilayered optical disc is of a reproduce-only type, a write-once type, or a rewritable type, and the formula is predetermined for each of the reproduce-only type, the write-once type, and the rewritable type.

* * * * *